(12) United States Patent
Byun

(10) Patent No.: US 11,237,961 B2
(45) Date of Patent: Feb. 1, 2022

(54) STORAGE DEVICE AND HOST DEVICE PERFORMING GARBAGE COLLECTION OPERATION

(71) Applicant: SK hynix Inc., Gyeonggi-do (KR)

(72) Inventor: Eu Joon Byun, Gyeonggi-do (KR)

(73) Assignee: SK hynix Inc., Gyeonggi-do (KR)

(*) Notice: Subject to any disclaimer, the term of this patent is extended or adjusted under 35 U.S.C. 154(b) by 6 days.

(21) Appl. No.: 16/688,164

(22) Filed: Nov. 19, 2019

(65) Prior Publication Data

US 2020/0394136 A1 Dec. 17, 2020

(30) Foreign Application Priority Data

Jun. 12, 2019 (KR) .................. 10-2019-0069607

(51) Int. Cl.
*G06F 3/06* (2006.01)
*G06F 12/0804* (2016.01)
*G06F 12/02* (2006.01)

(52) U.S. Cl.
CPC ...... *G06F 12/0804* (2013.01); *G06F 12/0253* (2013.01)

(58) Field of Classification Search
CPC ............. G06F 12/0804; G06F 12/0253; G06F 3/0614; G06F 3/064; G06F 3/0652; G06F 3/0658; G06F 3/0659; G06F 3/0688; G06F 12/0246; G06F 2212/7205
See application file for complete search history.

(56) References Cited

U.S. PATENT DOCUMENTS

| 9,229,854 B1* | 1/2016 | Kuzmin | G06F 11/1072 |
| 2011/0040930 A1* | 2/2011 | Shin | G06F 12/0246 711/103 |
| 2016/0062885 A1* | 3/2016 | Ryu | G06F 12/0246 711/103 |
| 2017/0300422 A1* | 10/2017 | Szubbocsev | G06F 12/10 |

FOREIGN PATENT DOCUMENTS

| KR | 10-1663437 | 10/2016 |
| KR | 10-2017-0120738 | 11/2017 |

* cited by examiner

*Primary Examiner* — Larry T Mackall
(74) *Attorney, Agent, or Firm* — IP & T Group LLP

(57) ABSTRACT

A storage device includes a semiconductor memory device and a controller. The semiconductor memory device includes a plurality of memory blocks. The controller controls an operation of the semiconductor memory device. The controller includes a device garbage collection controller configured to select a victim memory block among the plurality of memory blocks, generate victim LBA information including a logical block address of a valid page in the selected victim memory block, and transfer the victim LBA information to a host device.

8 Claims, 18 Drawing Sheets

STORAGE DEVICE AND HOST DEVICE PERFORMING GARBAGE COLLECTION OPERATION

CROSS-REFERENCE TO RELATED APPLICATION

The present application claims priority under 35 U.S.C. § 119(a) to Korean patent application number 10-2019-0069607, filed on Jun. 12, 2019, which is incorporated herein by reference in its entirety.

BACKGROUND

Field of Invention

The present disclosure relates to an electronic device, and more particularly, to a storage device, a host device, and a method of operating the storage device and host device.

Description of Related Art

A semiconductor memory device may be formed in a two-dimensional structure in which strings are horizontally arranged on a semiconductor substrate, or in a three-dimensional structure in which the strings are vertically stacked on the semiconductor substrate. A three-dimensional semiconductor memory device is was designed to resolve a limit of integration of a two-dimensional semiconductor memory device, and may include a plurality of memory cells that are vertically stacked on a semiconductor substrate. Operation of either type of semiconductor memory device may be controlled by a controller according to a request from a host device.

SUMMARY

An embodiment of the present disclosure provides a storage device and a host device capable of efficiently performing a garbage collection operation.

A storage device according to an embodiment of the present disclosure includes a semiconductor memory device and a controller. The semiconductor memory device includes a plurality of memory blocks. The controller controls an operation of the semiconductor memory device. The controller includes a device garbage collection controller configured to select a victim memory block among the plurality of memory blocks, generate victim LBA information including a logical block address of a valid page in the selected victim memory block, and transfer the victim LBA information to a host device.

In an embodiment, when the number of free memory blocks among the plurality of memory blocks is less than a victim LBA notification threshold value, the device garbage collection controller may select the victim memory block and transfer the victim LBA information to the host device.

In an embodiment, when the number of the free memory blocks among the plurality of memory blocks is less than a device GC threshold value, the device garbage collection controller may control the semiconductor memory device to perform a device garbage collection operation.

In an embodiment, the device GC threshold value may be less than the victim LBA notification threshold value.

In an embodiment, the device garbage collection controller may include a memory block monitor, a victim memory block selector, and a victim LBA generator. The memory block monitor may count the number of free memory blocks among the plurality of memory blocks and generate a first control signal when the number of the free memory blocks is less than a victim LBA notification threshold value. The victim memory block selector may generate victim memory block information by selecting at least one of the plurality of memory blocks as a victim memory block in response to the first control signal. The victim LBA generator may generate the victim LBA information based on the victim memory block information and transfer the victim LBA information to the host device.

In an embodiment, the device garbage collection controller may further include a command generator. The memory block monitor may generate a second control signal when the number of the free memory blocks is less than a device GC threshold value. The victim memory block selector may generate a GC control signal for performing a device garbage collection operation on the victim memory block in response to the second control signal. The command generator may generate at least one command for controlling the semiconductor memory device to perform the device garbage collection operation, in response to the GC control signal.

A host device according to another embodiment of the present disclosure stores data in a storage area in a storage device. The storage area is divided into a plurality of segments. The host device includes a host GC controller for controlling a host garbage collection operation. The host GC controller includes a victim LBA receiver, a victim segment selector, and a request generator. The victim LBA receiver receives victim LBA information from the storage device. The victim segment selector selects a victim segment targeted for the host garbage collection operation, based on the victim LBA information. The request generator generates at least one request for controlling the storage device to perform the host garbage collection operation, based on the victim segment.

In an embodiment, each of the plurality of segments may include a plurality of data blocks. The victim segment selector may select a segment including a data block corresponding to the victim LBA information among the plurality of segments as the victim segment.

In an embodiment, the host GC controller may further include a segment monitor that counts the number of free segments among the plurality of segments. The segment monitor may generate a third control signal when the number of the free memory blocks is less than a host GC threshold value. The victim segment selector may generate an HGC control signal for performing a host garbage collection operation on the victim segment, in response to the third control signal. The request generator may generate at least one request for controlling the storage device to perform the host garbage collection operation, in response to the HGC control signal.

According to further another embodiment of the present disclosure, a method of operating a controller that controls a semiconductor memory device including a plurality of memory blocks includes counting the number of free memory blocks among the plurality of memory blocks, determining whether the number of the free memory blocks is less than a victim LBA notification threshold value, and generating victim LBA information based on a result of the determining operation and transferring the victim LBA information to a host device.

In an embodiment, the generating and the transferring may include selecting at least one of the plurality of memory blocks as a victim memory block when the number of the free memory blocks is less than the victim LBA notification threshold value, generating the victim LBA information including a logical block address corresponding to a valid page in the victim memory block, and transferring the generated victim LBA information to the host device.

In an embodiment, the method of operating the controller may further include determining whether the number of the free memory blocks is less than a device GC threshold value, and performing device garbage collection on the semiconductor memory device when the number of the free memory blocks is less than the device GC threshold value.

In an embodiment, the performing of the device garbage collection may include copying valid page data of the victim memory block to a target memory block, and releasing the victim memory block as a free memory block.

According to further another embodiment of the present disclosure, a method of operating a host device that stores data in a storage area of a storage device is provided. The storage area is divided into a plurality of segments. The method includes receiving victim LBA information from the storage device, and performing a host garbage collection operation based on the victim LBA information.

In an embodiment, the performing of the host garbage collection operation based on the victim LBA information may include selecting a victim segment among the plurality of segments based on the victim LBA information, and copying a valid data block of the victim segment to a target segment.

In an embodiment, the performing of the host garbage collection operation based on the victim LBA information may include releasing the victim segment as a free segment.

In an embodiment, the performing of the host garbage collection operation based on the victim LBA information may include counting the number of free segments among the plurality of segments, determining whether the number of the free segments is less than a host GC threshold value, selecting a victim segment from the plurality of segments based on the victim LBA information when the number of the free segments is less than the host GC threshold value, and copying a valid data block of the victim segment to a target segment.

A data processing system according to further another embodiment of the present disclosure includes a memory system and a host. The memory system includes a memory device including plural memory blocks each having plural pages, and a controller configured to control the memory device to perform a garbage collection operation at a memory block level on select memory blocks among the memory blocks, when a number of free blocks is less than a first threshold. The host configured to control the memory system to perform a garbage collection operation at a data segment level based on information of logical addresses of one or more valid pages included in one or more victim blocks selected among the memory blocks. The controller is further configured to provide the information to the host when the number of free blocks among the memory blocks is less than a second threshold. The first threshold is less than the second threshold.

According to an embodiment of the present disclosure, a storage device and a host device capable of efficiently performing a garbage collection operation may be provided.

DETAILED DESCRIPTION

The advantages and features of the present disclosure, and methods of accomplishing the same will become more apparent through embodiments that are described in detail below together with the accompanying drawings. However, the present invention is not limited to the embodiments described herein but may be embodied in other forms. The present embodiments are provided to describe the invention in detail so that those skilled in the art to which the invention pertains may easily implement and practice the present invention. It is further noted that reference herein to "an embodiment," "another embodiment" or the like is not necessarily to only one embodiment, and different references to any such phrase are not necessarily to the same embodiment(s).

Throughout the specification, in the context of describing the physical relationship between two components, the term "connected" means that the two components may be directly connected or indirectly connected with one or more other components interposed therebetween, unless the context clearly indicates otherwise. Throughout the specification, open-ended terms such as "comprises," "includes," "having" and the like, as well as variations thereof, do not preclude the existence or addition of one or more other components or operations, in addition to those stated.

Preferred embodiments of the present disclosure are described in detail below with reference to the accompanying drawings. Throughout the accompanying drawings, the same components are denoted by the same reference symbols. In addition, detailed description of well-known functions and configurations that may obscure aspects and features of the present invention may be omitted.

Figure 1:
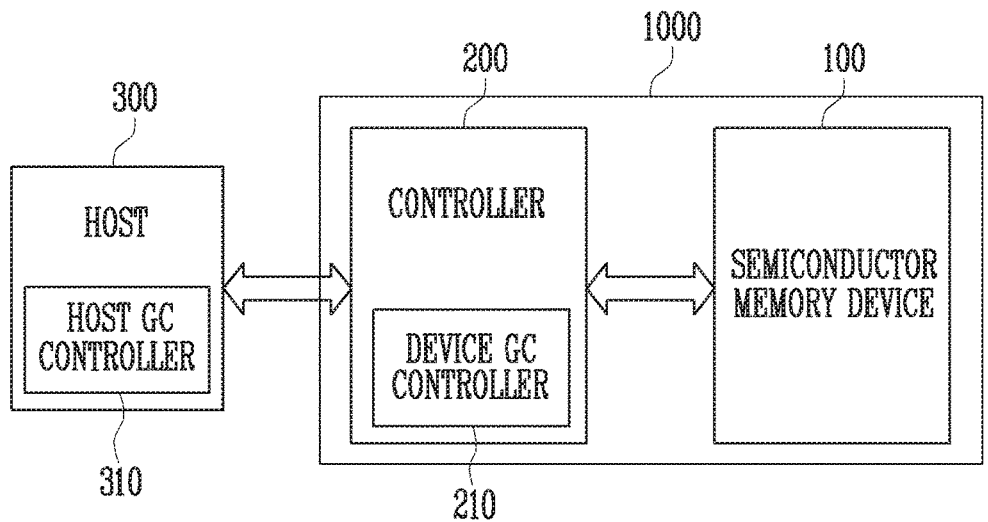
FIG. 1 is a block diagram illustrating a storage device and a host device according to an embodiment of the present disclosure.

FIG. 1 is a block diagram illustrating a storage device 1000 and a host device 300 according to an embodiment of the present disclosure.

Referring to FIG. 1, the storage device 1000 includes a semiconductor memory device 100 and a controller 200. In addition, the storage device 1000 communicates with the host device 300. The controller 200 controls overall operations of the semiconductor memory device 100. In addition, the controller 200 controls an operation of the semiconductor memory device 100 based on an operation request received from the host device 300.

The semiconductor memory device 100 operates under control of the controller 200. The semiconductor memory device 100 includes a memory cell array having a plurality of memory blocks. In an embodiment, the semiconductor memory device 100 may be a flash memory device.

The controller 200 may receive a write request, a read request, a delete request, or the like from the host device 300, and control the semiconductor memory device 100 based on the received requests. More specifically, the controller 200 may generate commands for controlling the operation of the semiconductor memory device 100 and transmit the commands to the semiconductor memory device 100.

The semiconductor memory device 100 is configured to receive a command and an address from the controller 200 and to access an area selected by the address of the memory cell array. That is, the semiconductor memory device 100 performs an internal operation corresponding to a command on the area selected by the address.

For example, the semiconductor memory device 100 may perform a program operation, a read operation, and an erase operation. During the program operation, the semiconductor memory device 100 may program data in the area selected by the address. During the read operation, the semiconductor memory device 100 may read data from the area selected by the address. During the erase operation, the semiconductor memory device 100 may erase data stored in the area selected by the address.

The host device 300 includes a host garbage collection controller (host GC controller) 310. The host GC controller 310 controls garbage collection of data corresponding to a logical block address in the storage device 1000. In particular, the host GC controller 310 controls a host garbage collection operation (host GC) performed by the host device. To this end, the host GC controller 310 may perform the host GC by transferring a read request and a write request to the storage device 1000.

The controller 200 includes a device garbage collection controller (device GC controller) 210. The device GC controller controls garbage collection of data corresponding to a physical block address in the storage device 1000. In particular, the device GC controller 310 controls a device garbage collection operation (device GC) performed by the controller 200 of the storage device 1000. To this end, the device GC controller 310 may perform the device GC by transferring a read command and a program command to the semiconductor memory device 100.

In an embodiment, the host GC and the device GC may be performed separately. In order to perform the host GC, the host device 300 may transfer the read request and the write request to the storage device 1000. The storage device 1000 performs an operation according to the received read request and the write request. Meanwhile, when the controller 200 determines to perform the device GC, the device GC may be performed regardless of the host GC. For example, when the number of free memory blocks in the semiconductor memory device 100 is insufficient, the controller 200 may determine to perform the device GC which is started regardless of a request of the host 300. As described above, since the host GC and the device GC may be performed independently of each other, the garbage collection operation may be repeatedly performed based on some data. When the garbage collection operation is repeatedly performed, the semiconductor memory device 100 may be subjected to unnecessary operations. This may be a factor that shortens life of the storage device 1000.

Regarding the storage device 1000 according to an embodiment of the present disclosure, in a situation in which the device GC is expected to be performed, a victim memory block is selected, and victim LBA information included in the victim memory block is transferred to the host device 300. Then, according to an embodiment of the present disclosure, the host device 300 may perform the host GC based on the received victim LBA information. Therefore, unnecessary repetition or duplication of the host GC and the device GC may be prevented. Accordingly, an efficient garbage collection operation may be performed on the storage device 1000, and the life of the storage device 1000 may be prevented from being shortened.

Figure 2:
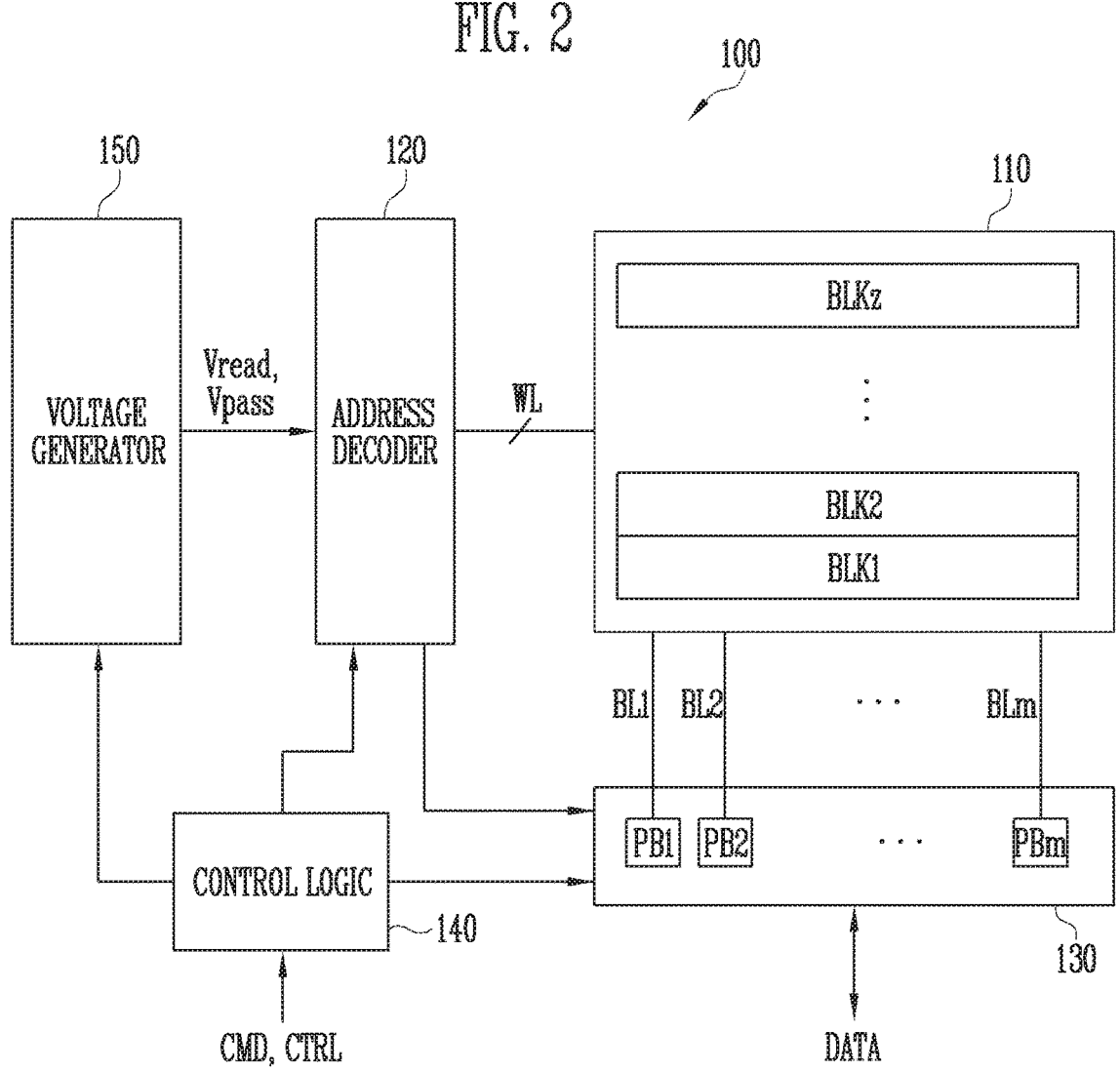
FIG. 2 is a block diagram illustrating a semiconductor memory device, such as that of FIG. 1.

FIG. 2 is a block diagram illustrating the semiconductor memory device according to FIG. 1.

Referring to FIG. 2, the semiconductor memory device 100 includes a memory cell array 110, an address decoder 120, a read and write circuit 130, control logic 140, and a voltage generator 150.

The memory cell array 110 includes a plurality of memory blocks BLK1 to BLKz. The plurality of memory blocks BLK1 to BLKz are connected to the address decoder 120 through word lines WL. The plurality of memory blocks BLK1 to BLKz are connected to the read and write circuit 130 through bit lines BL1 to BLm. Each of the plurality of memory blocks BLK1 to BLKz includes a plurality of memory cells. In an embodiment, the plurality of memory cells are non-volatile memory cells, and may be configured of non-volatile memory cells having a vertical channel structure. The memory cell array 110 may be configured as a memory cell array of a two-dimensional structure. According to an embodiment, the memory cell array 110 may be configured as a memory cell array of a three-dimensional structure. Also, each of the plurality of memory cells in the memory cell array may store at least one bit of data. In an embodiment, each such memory cell may be a single-level cell (SLC) storing one bit of data. In another embodiment, each such memory cell may be a multi-level cell (MLC) storing two bits of data. In still another embodiment, each such memory cell may be a triple-level cell (TLC) storing three bits of data. In yet another embodiment, each such memory cell be a quad-level cell storing four bits of data. According to an embodiment, the memory cell array 110 may include a plurality of memory cells each storing five or more bits of data.

The address decoder 120, the read and write circuit 130, the control logic 140, and the voltage generator 150 operate as a peripheral circuit that drives the memory cell array 110. The address decoder 120 is connected to the memory cell array 110 through the word lines WL. The address decoder 120 is configured to operate in response to control of the control logic 140. The address decoder 120 receives an address through an input/output buffer (not shown) inside the semiconductor memory device 100.

The address decoder 120 is configured to decode a block address among received addresses. The address decoder 120 selects at least one memory block according to the decoded block address. In addition, the address decoder 120 applies a read voltage Vread generated in the voltage generator 150 to a selected word line of the selected memory block at a time of a read voltage application operation during a read operation, and applies a pass voltage Vpass to the remaining unselected word lines. In addition, during a program verify operation, the address decoder 120 applies a verify voltage generated in the voltage generator 150 to the selected word line of the selected memory block, and applies the pass voltage Vpass to the remaining unselected word lines.

The address decoder 120 is configured to decode a column address of the received addresses. The address decoder 120 transmits the decoded column address to the read and write circuit 130.

A read operation and a program operation of the semiconductor memory device 100 are performed in a page unit. Addresses received at a time of a request of the read operation and the program operation include a block address, a row address, and a column address. The address decoder 120 selects one memory block and one word line according to the block address and the row address. The column address is decoded by the address decoder 120 and is provided to the read and write circuit 130.

The address decoder 120 may include a block decoder, a row decoder, a column decoder, an address buffer, and the like.

The read and write circuit 130 includes a plurality of page buffers PB1 to PBm. The read and write circuit 130 may operate as a "read circuit" during a read operation of the memory cell array 110 and may operate as a "write circuit" during a write operation of the memory cell array 110. The plurality of page buffers PB1 to PBm are connected to the memory cell array 110 through the bit lines BL1 to BLm. During the read operation and the program verify operation, in order to sense a threshold voltage of the memory cells, the plurality of page buffers PB1 to PBm senses a change of an amount of a current flowing according to a programmed state of a corresponding memory cell through a sensing node while continuously supplying a sensing current to the bit lines connected to the memory cells, and latches the sensed change as sensing data. The read and write circuit 130 operates in response to page buffer control signals output from the control logic 140.

During the read operation, the read and write circuit 130 senses data of the memory cell, temporarily stores read data, and outputs data DATA to the input/output buffer (not shown) of the semiconductor memory device 100. In an embodiment, the read and write circuit 130 may include a column selection circuit, and the like, in addition to the page buffers (or page registers).

The control logic 140 is connected to the address decoder 120, the read and write circuit 130, and the voltage generator 150. The control logic 140 receives a command CMD and a control signal CTRL through the input/output buffer (not shown) of the semiconductor memory device 100. The control logic 140 is configured to control overall operations of the semiconductor memory device 100 in response to the control signal CTRL. In addition, the control logic 140 outputs a control signal for adjusting a sensing node precharge potential level of the plurality of page buffers PB1 to PBm. The control logic 140 may control the read and write circuit 130 to perform the read operation of the memory cell array 110.

The voltage generator 150 generates the read voltage Vread and the pass voltage Vpass during the read operation in response to the control signal output from the control logic 140. In order to generate a plurality of voltages having various voltage levels, the voltage generator 150 may include a plurality of pumping capacitors that receive an internal power voltage, and generate the plurality of voltages by selectively activating the plurality of pumping capacitors in response to the control of the control logic 140.

The address decoder 120, the read and write circuit 130, and the voltage generator 150 may function as a "peripheral circuit" that performs a read operation, a write operation, and an erase operation on the memory cell array 110. The peripheral circuit performs the read operation, the write operation, and the erase operation on the memory cell array 110 based on the control of the control logic 140.

Figure 3:
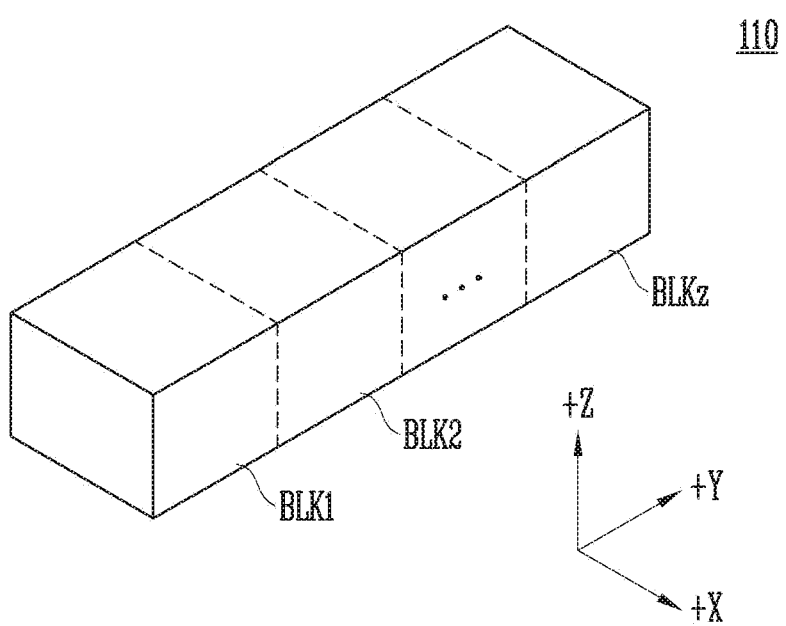
FIG. 3 is a diagram illustrating an embodiment of a memory cell array, such as that of FIG. 2.

FIG. 3 is a diagram illustrating an embodiment of the memory cell array of FIG. 2.

Referring to FIG. 3, the memory cell array 110 includes a plurality of memory blocks BLK1 to BLKz. Each memory block may have a three-dimensional structure. Each memory block includes a plurality of memory cells stacked on a substrate. Such plurality of memory cells are arranged along a +X direction, a +Y direction, and a +Z direction. A structure of each memory block is described in more detail with reference to FIGS. 4 and 5.

Figure 4:
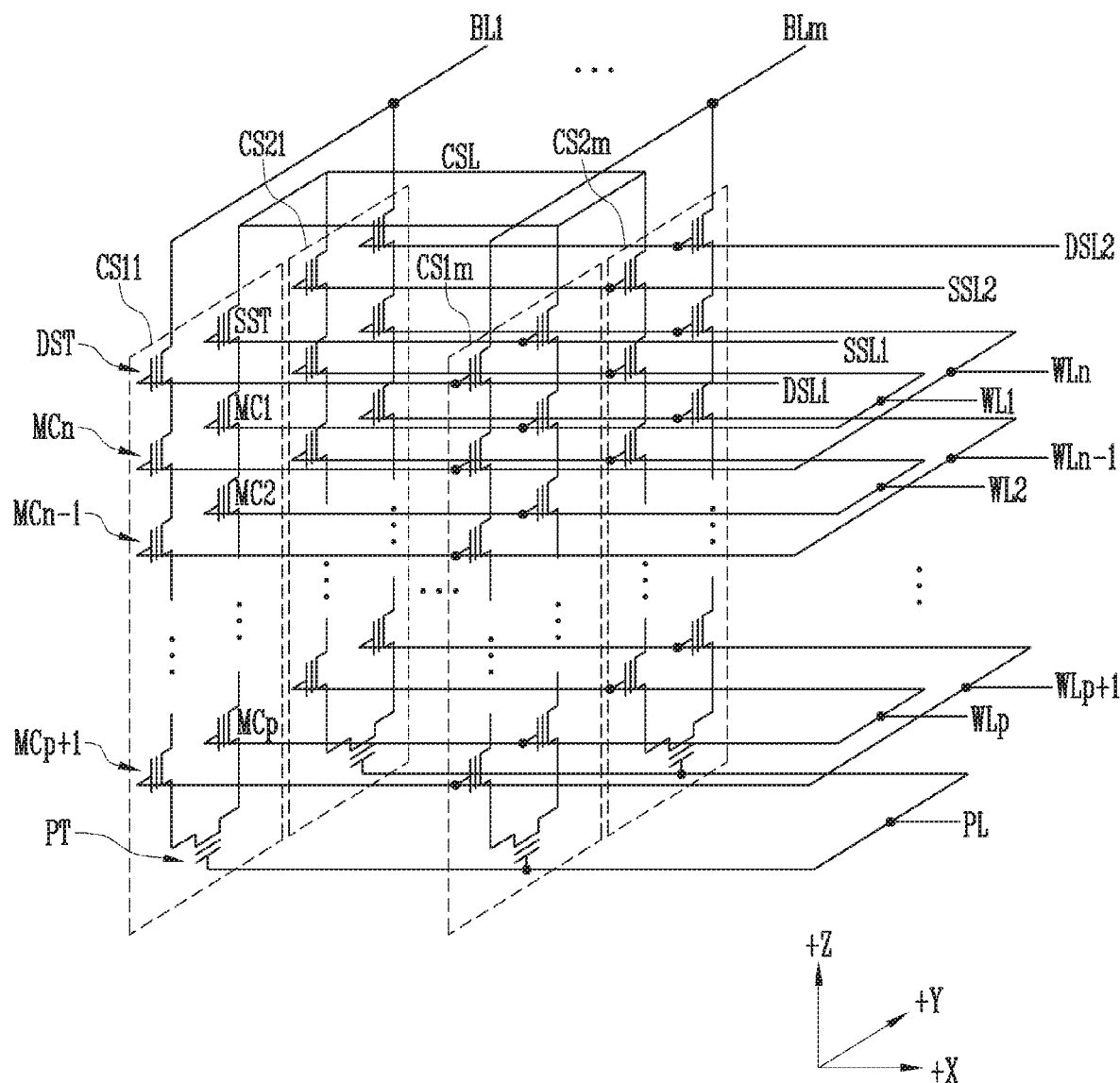
FIG. 4 is a circuit diagram illustrating a representative memory block BLKa of memory blocks BLK1 to BLKz of FIG. 3.

FIG. 4 is a circuit diagram illustrating a representative memory block BLKa of the memory blocks BLK1 to BLKz of FIG. 3.

Referring to FIG. 4, the memory block BLKa includes a plurality of cell strings CS11 to CS1$m$ and CS21 to CS2$m$. In an embodiment, each of the plurality of cell strings CS11 to CS1$m$ and CS21 to CS2$m$ may be formed in a 'U' shape. In the memory block BLKa, m cell strings are arranged in a row direction (that is, the +X direction). In FIG. 4, two cell strings are arranged in a column direction (that is, the +Y direction). However, this is for clarity; three or more cell strings may be arranged in the column direction.

Each of the plurality of cell strings CS11 to CS1$m$ and CS21 to CS2$m$ includes at least one source select transistor SST, first to n-th memory cells MC1 to MCn, a pipe transistor PT, and at least one drain select transistor DST.

Each of the select transistors SST and DST and the memory cells MC1 to MCn may have a similar structure. In an embodiment, each of the select transistors SST and DST and the memory cells MC1 to MCn may include a channel layer, a tunneling insulating film, a charge storage film, and a blocking insulating film. In an embodiment, a pillar for providing the channel layer may be provided in each cell string. In an embodiment, a pillar for providing at least one of the channel layer, the tunneling insulating film, the charge storage film, and the blocking insulating film may be provided in each cell string.

The source select transistor SST of each cell string is connected between a common source line CSL and the memory cells MC1 to MCp.

In an embodiment, the source select transistors of the cell strings arranged in the same row are connected to a source select line extending in the row direction, and the source select transistors of the cell strings arranged in different rows are connected to different source select lines. In FIG. 4, the source select transistors of the cell strings CS11 to CS1m of a first row are connected to a first source select line SSL. The source select transistors of the cell strings CS21 to CS2m of a second row are connected to a second source select line SSL2.

In another embodiment, the source select transistors of the cell strings CS11 to CS1m and CS21 to CS2m may be commonly connected to one source select line.

The first to n-th memory cells MC1 to MCn of each cell string are connected between the source select transistor SST and the drain select transistor DST.

The first to n-th memory cells MC1 to MCn may be divided into first to p-th memory cells MC1 to MCp and (p+1)-th to n-th memory cells MCp+1 to MCn. The first to p-th memory cells MC1 to MCp are sequentially arranged in a −Z direction, and are connected in series between the source select transistor SST and the pipe transistor PT. The (p+1)-th to n-th memory cells MCp+1 to MCn are sequentially arranged in the +Z direction, and are connected in series between the pipe transistor PT and the drain select transistor DST. The first to p-th memory cells MC1 to MCp and the (p+1)-th to n-th memory cells MCp+1 to MCn are connected to each other through the pipe transistor PT. Gates of the first to n-th memory cells MC1 to MCn of each cell string are connected to the first to n-th word lines WL1 to WLn, respectively.

A gate of the pipe transistor PT of each cell string is connected to a pipeline PL.

The drain select transistor DST of each cell string is connected between a corresponding bit line and the memory cells MCp+1 to MCn. The cell strings arranged in the row direction are connected to the drain select line extending in the row direction. The drain select transistors of the cell strings CS11 to CS1m of the first row are connected to a first drain select line DSL1. The drain select transistors of the cell strings CS21 to CS2m of the second row are connected to a second drain select line DSL2.

The cell strings arranged in the column direction are connected to the bit lines extending in the column direction. In FIG. 4, the cell strings CS11 and CS21 of the first column are connected to the first bit line BL1. The cell strings CS1m and CS2m of the m-th column are connected to the m-th bit line BLm.

The memory cells connected to the same word line in the cell strings arranged in the row direction configure one page. For example, the memory cells connected to the first word line WL1, among the cell strings CS11 to CS1m of the first row configure one page. The memory cells connected to the first word line WL1, among the cell strings CS21 to CS2m of the second row configure another page. The cell strings arranged in one row direction may be selected by selecting any one of the drain select lines DSL1 and DSL2. One page of the selected cell strings may be selected by selecting any one of the word lines WL1 to WLn.

In another embodiment, even bit lines and odd bit lines may be provided instead of the first to m-th bit lines BL1 to BLm. In addition, even-numbered cell strings among the cell strings CS11 to CS1m or CS21 to CS2m arranged in the row direction may be connected to the even bit lines, and odd-numbered cell strings among the cell strings CS11 to CS1m or CS21 to CS2m arranged in the row direction may be connected to odd bit lines, respectively.

In an embodiment, at least one of the first to n-th memory cells MC1 to MCn may be used as a dummy memory cell. For example, at least one dummy memory cell is provided to reduce an electric field between the source select transistor SST and the memory cells MC1 to MCp. Alternatively, at least one dummy memory cell is provided to reduce an electric field between the drain select transistor DST and the memory cells MCp+1 to MCn. As more dummy memory cells are provided, reliability of an operation for the memory block BLKa is improved, however, the size of the memory block BLKa Increases. As less memory cells are provided, the size of the memory block BLKa may be reduced, however, the reliability of the operation for the memory block BLKa may be reduced.

In order to efficiently control the dummy memory cell(s), each may have a required threshold voltage. Before or after an erase operation for the memory block BLKa, program operations for all or a part of the dummy memory cells may be performed. When the erase operation is performed after the program operation is performed, the dummy memory cells may have the required threshold voltage by controlling a voltage applied to dummy word lines connected to the respective dummy memory cells.

Figure 5:
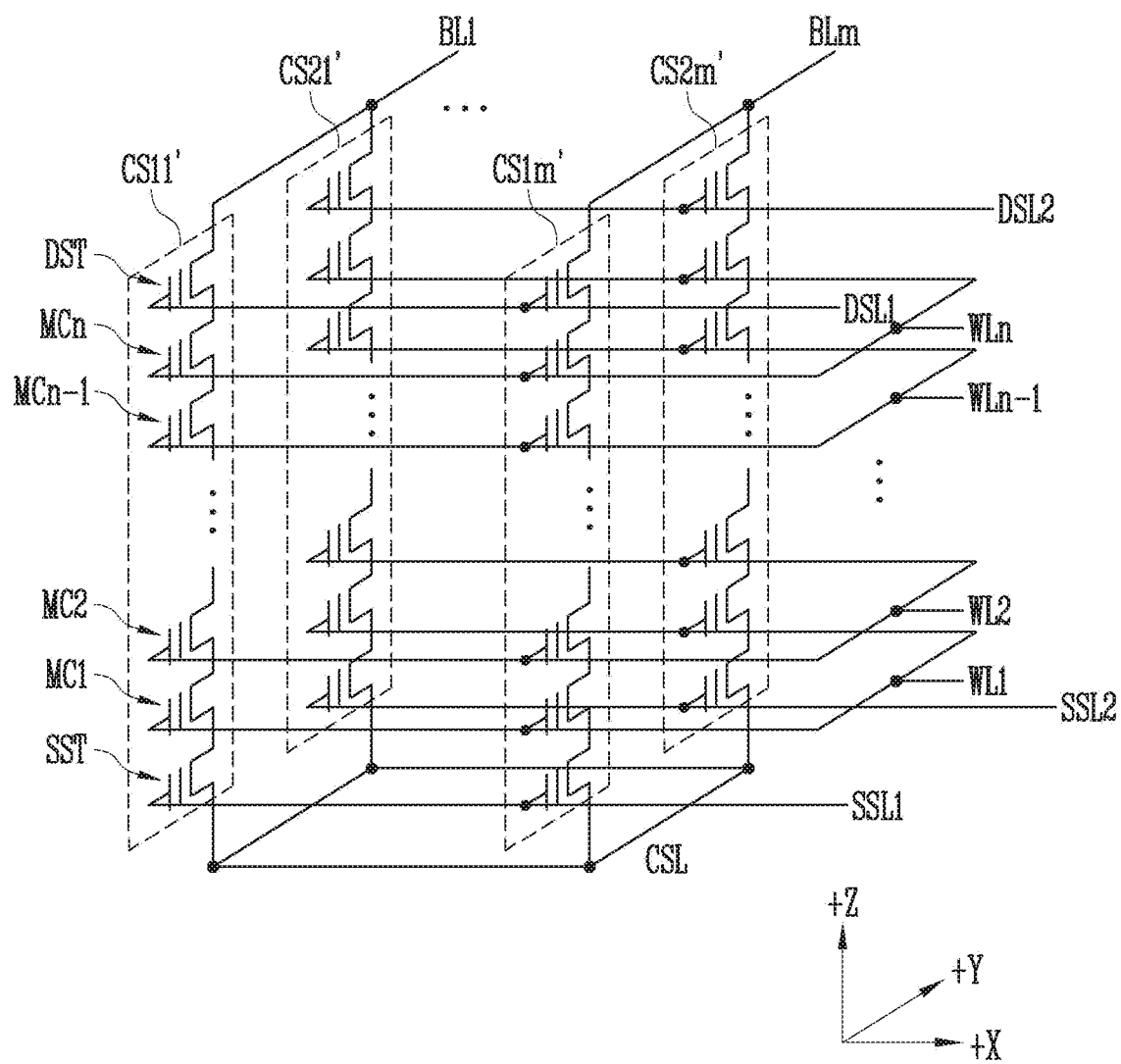
FIG. 5 is a circuit diagram illustrating another embodiment of a representative memory block BLKb of the memory blocks BLK1 to BLKz of FIG. 3.

FIG. 5 is a circuit diagram illustrating another embodiment of a representative memory block BLKb of the memory blocks BLK1 to BLKz of FIG. 3.

Referring to FIG. 5, the memory block BLKb includes a plurality of cell strings CS11' to CS1m' and CS21' to CS2m'. Each of the plurality of cell strings CS11' to CS1m' and CS21' to CS2m' extends along a +Z direction. Each of the plurality of cell strings CS11' to CS1m' and CS21' to CS2m' includes at least one source select transistor SST, first to n-th memory cells MC1 to MCn, and at least one drain select transistor DST stacked on a substrate (not shown) under the memory block BLKb.

The source select transistor SST of each cell string is connected between a common source line CSL and memory cells MC1 to MCn. The source select transistors of the cell strings arranged in the same row are connected to the same source select line. The source select transistors of the cell strings CS11' to CS1m' arranged in a first row are connected to a first source select line SSL1. The source select transistors of the cell strings CS21' to CS2m' arranged in a second row are connected to a second source select line SSL2. In another embodiment, the source select transistors of the cell strings CS11' to CS1m' and CS21' to CS2m' may be commonly connected to one source select line.

The first to n-th memory cells MC1 to MCn of each cell string are connected in series between the source select transistor SST and the drain select transistor DST. Gates of the first to n-th memory cells MC1 to MCn are connected to first to the n-th word lines WL1 to WLn, respectively.

The drain select transistor DST of each cell string is connected between a corresponding bit line and the memory cells MC1 to MCn. The drain select transistors of the cell strings arranged in the row direction are connected to a drain select line extending in the row direction. The drain select transistors of the cell strings CS11' to CS1m' of a first row are connected to a first drain select line DSL1. The drain select transistors of the cell strings CS21' to CS2m' of a second row are connected to a second drain select line DSL2.

As a result, the memory block BLKb of FIG. 5 has an equivalent circuit similar to that of the memory block BLKa of FIG. 4 except that the pipe transistor PT is excluded from each cell string.

In another embodiment, even bit lines and odd bit lines may be provided instead of the first to m-th bit lines BL1 to BLm. In addition, even-numbered cell strings among the cell strings CS11' to CS1m' or CS21' to CS2m' arranged in the row direction may be connected to even bit lines, and odd-numbered cell strings among the cell strings CS11' to CS1m' or CS21' to CS2m' arranged in the row direction may be connected to odd bit lines, respectively.

In an embodiment, at least one of the first to n-th memory cells MC1 to MCn may be used as a dummy memory cell. For example, at least one dummy memory cell is provided to reduce an electric field between the source select transistor SST and the memory cells MC1 to MCn. Alternatively, at least one dummy memory cell is provided to reduce an electric field between the drain select transistor DST and the memory cells MC1 to MCn. As more dummy memory cells are provided, reliability of an operation for the memory block BLKb is improved, however, the size of the memory block BLKb increases. As less memory cells are provided, the size of the memory block BLKb may be reduced, however, the reliability of the operation for the memory block BLKb may be reduced.

In order to efficiently control the dummy memory cell(s), each may have a required threshold voltage. Before or after an erase operation for the memory block BLKb, program operations for all or a part of the dummy memory cells may be performed. When the erase operation is performed after the program operation is performed, the dummy memory cells may have the required threshold voltage by controlling a voltage applied to the dummy word lines connected to the respective dummy memory cells.

Figure 6:
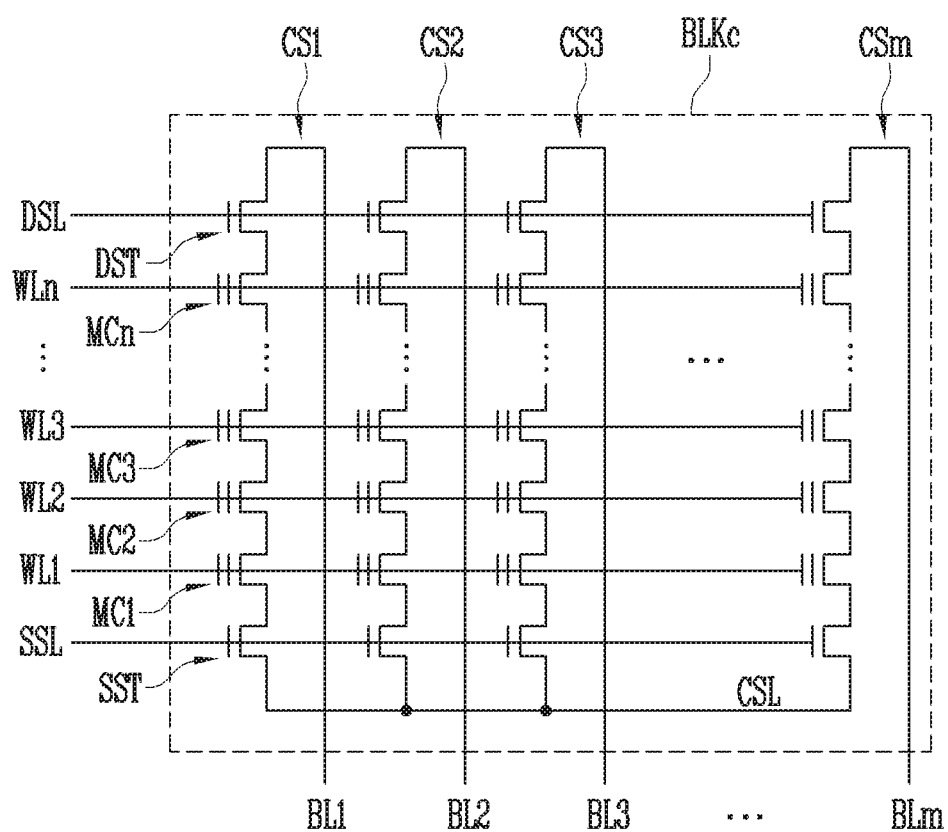
FIG. 6 is a circuit diagram illustrating an embodiment of a representative memory block BLKc of the memory blocks BLK1 to BLKz included in the memory cell array 110 of FIG. 2.

FIG. 6 is a circuit diagram illustrating an embodiment of a representative memory block BLKc of the memory blocks BLK1 to BLKz included in the memory cell array 110 of FIG. 2.

Referring to FIG. 6, the memory block BLKc includes a plurality of cell strings CS1 to CSm. The plurality of cell strings CS1 to CSm may be connected to a plurality of bit lines BL1 to BLm, respectively. Each of the cell strings CS1 to CSm Includes at least one source select transistor SST, first to n-th memory cells MC1 to MCn, and at least one drain select transistor DST.

Each of the select transistors SST and DST and the memory cells MC1 to MCn may have a similar structure. In an embodiment, each of the select transistors SST and DST and the memory cells MC1 to MCn may include a channel layer, a tunneling insulating film, a charge storage film, and a blocking insulating film. The source select transistor SST of the cell string is connected between a common source line CSL and the memory cells MC1 to MCn.

The first to n-th memory cells MC1 to MCn of each cell string are connected between the source select transistor SST and the drain select transistor DST.

The drain select transistor DST of each cell string is connected between a corresponding bit line and the memory cells MC1 to MCn.

Memory cells connected to the same word line configure one page. The cell strings CS1 to CSm may be selected by selecting the drain select line DSL. One page among the selected cell strings may be selected by selecting any one of the word lines WL1 to WLn.

In another embodiment, even bit lines and odd bit lines may be provided instead of the first to m-th bit lines BL1 to BLm. Even-numbered cell strings among the cell strings CS1 to CSm may be connected to even bit lines, and odd-numbered cell strings may be connected to odd bit lines, respectively.

Figure 7:
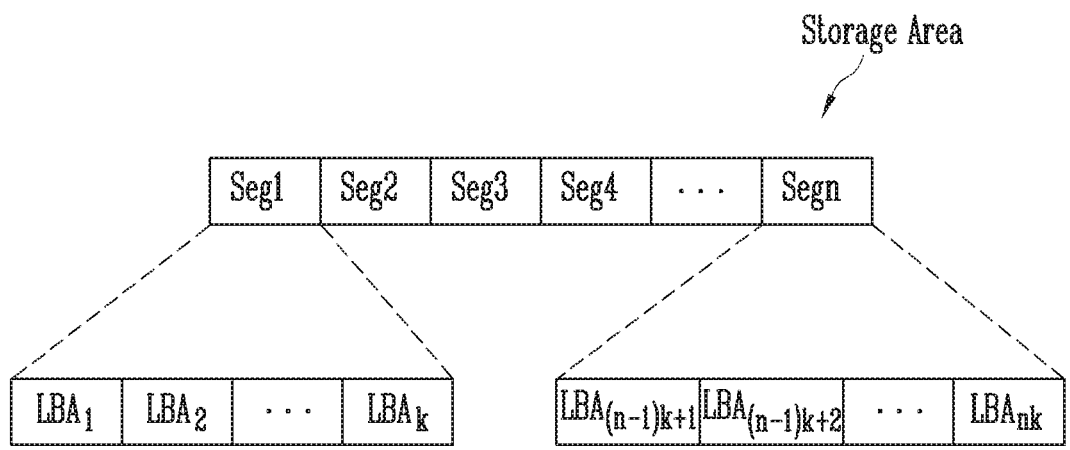
FIG. 7 is a diagram illustrating a storage area managed by a host device, such as that of FIG. 1.

FIG. 7 is a diagram illustrating a storage area managed by the host device 300 of FIG. 1.

Referring to FIG. 7, the host device 300 may manage the storage area by dividing the storage area into a plurality of segments, e.g., Seg1 to Segn. In a case of a typical host device, a traditional file system that updates specific data to a designated position (in-place update) may be used. Such a traditional file system may not be suitable for a device that is not capable of performing physical overwriting, such as a flash memory device. Therefore, a log-structured file system which is suitable for a storage device may be used in a flash memory device.

The log-structured file system does not overwrite an original position when updating data, but invalidates previously written data, writes newly written data to another position, and writes data sequentially. However, since the invalidated data remains, there is no consecutive space for sequential writing before a storage capacity is used up. Therefore, in order to secure consecutive free space for sequential writing, a garbage collection operation that collects invalidated data and creates consecutive free space is required to be performed in the file system of the host device. This may be referred to as host garbage collection operation (host GC).

As one of the log-structured file systems, a flash-friendly file system (F2FS) may be used. The F2FS is a file system designed for a characteristic of a flash memory and shows high performance in a flash storage device. A basic write unit of the F2FS is a 4 KB data block, and sequential writing may be performed by receiving a segment that is a set of 512 consecutive data blocks. As shown in FIG. 7, the storage area is divided into n segments, e.g., Seg1 to Segn, and each segment includes k data blocks. A unique logical block address (LBA) may be given to each data block. For example, the first segment Seg1 may include data blocks corresponding to first to k-th LBAs $LBA_1$ to $LBA_K$. As described above, one segment may include 512 data blocks. That is, k may be 512 as an example.

Figure 8:
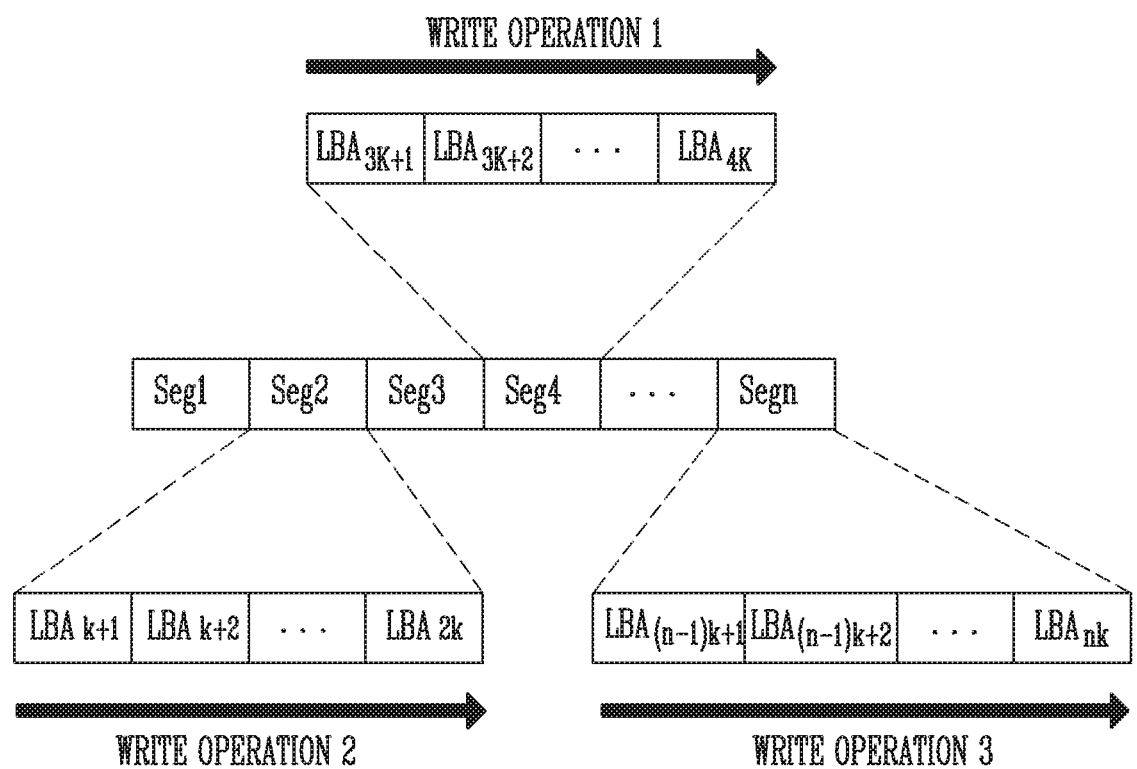
FIG. 8 is a diagram for describing a write operation of a host device in a storage area, such as that shown in FIG. 7.

FIG. 8 is a diagram for describing a write operation of the host device 300 in the storage area shown in FIG. 7. In the log-structured file system, data is sequentially recorded in a log and is managed. In comparison with a typical file system in which a meta data area and a user data area are managed separately, the log-structured file system records each piece of data in a log. Updated data is written to a new log and previous data is processed as invalid data. Garbage collection is performed to remove an unused log and arrange room in which a new log is to be written.

As shown in FIG. 8, a write operation of the host device 300 may be performed by sequentially writing data in a segment. For example, in a case of a first write operation WRITE OPERATION 1, data may be sequentially written from a first logical block address $LBA_{3K+1}$ to a last logical block address $LBA_{4K}$ in a fourth segment Seg4. In a case of a second write operation WRITE OPERATION 2, data may be sequentially written from a first logical block address $LBA_{K+1}$ to a last logical block address $LBA_{2K}$ in a second segment Seg2. In a case of a third write operation WRITE OPERATION 3, data may be sequentially written from a first logical block address $LBA_{(n-1)K+1}$ to a last logical block address $LBA_{nK}$ in an n-th segment Segn. A segment to which data is written is not sequentially selected. When all pieces of data are written to a specific segment, one of free segments is selected to perform a next write operation.

Figure 9:
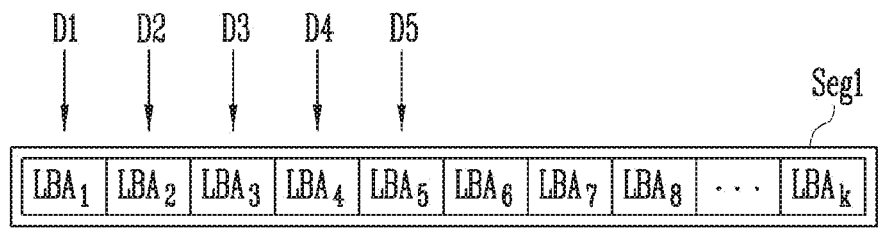
FIG. 9 is a diagram for describing the write operation shown in FIG. 8 in more detail.

FIG. 9 is a diagram for describing the write operation shown in FIG. 8 in more detail.

Referring to FIG. 9, data is sequentially written in a selected segment. As shown in FIG. 9, data is sequentially written during a write operation for a first segment Seg1. That is, a first data block D1 is written to a position corresponding to a first LBA ($LBA_1$), and a second data block D2 is written to a position corresponding to a second LBA ($LBA_2$). As described above, data blocks D1 to D5 are sequentially written to $LBA_1$ to $LBA_k$ in the first segment Seg1. When a third data block D3 is updated in a state in which the first to fifth data blocks D1 to D5 are written, the updated new third data block may be written to a position corresponding to a sixth LBA ($LBA_6$), and the data block of $LBA_3$ may be invalidated. As described above, the F2FS which is one of the log-structured file systems does not overwrite data, records updated data to another position, and sequentially writes data in one segment.

Figure 10:
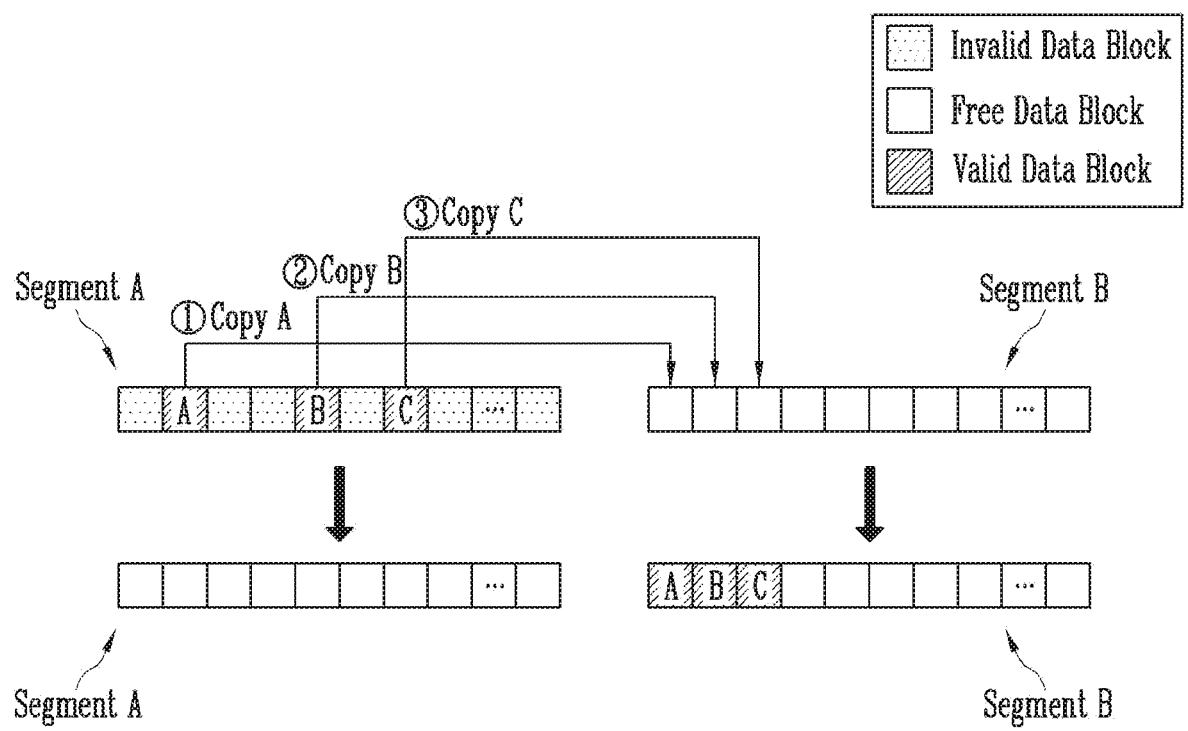
FIG. 10 is a diagram for describing a garbage collection operation performed by a host device.

FIG. 10 is a diagram for describing a garbage collection operation performed by the host device 300. Garbage collection of the host device is a technique for managing a storage area in which an invalid data block is written, which removes the invalid data block from a log-structured file system and creates empty space for writing a new data blocks. As shown in FIG. 10, valid data blocks A, B, and C of a segment A that is selected as a victim segment during the garbage collection in the log-structured file system is copied to free data blocks of a segment B that is a free segment. Thereafter, all data blocks in the segment A are deleted, and the segment A is released as a free segment. A storage space may be secured by removing invalid data blocks through such a method.

Figure 11:
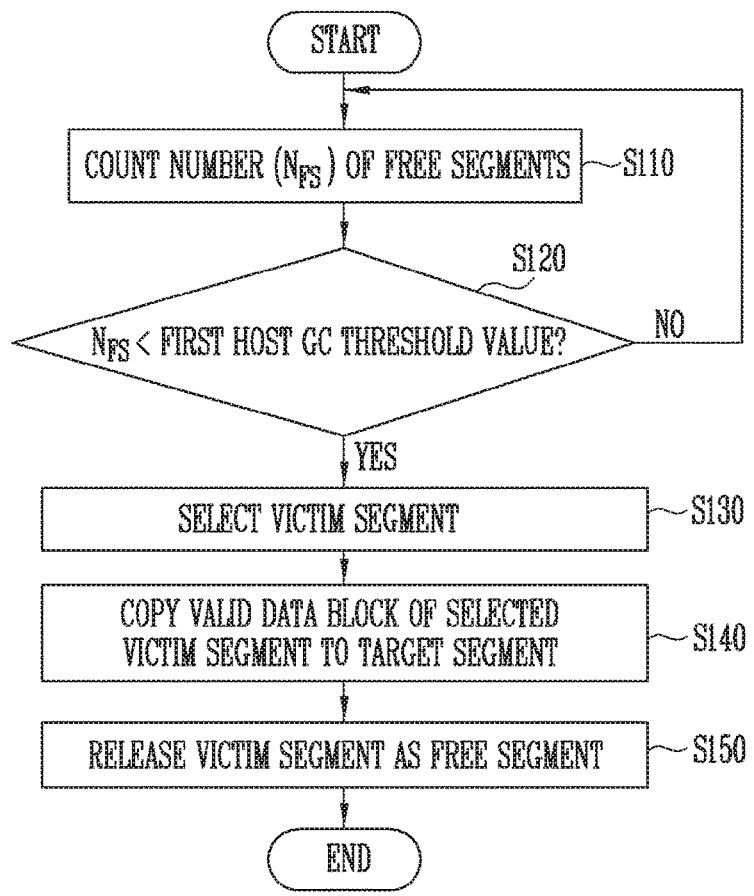
FIG. 11 is a flowchart illustrating the garbage collection operation performed by a host device.

FIG. 11 is a flowchart illustrating the garbage collection operation performed by the host device 300.

Referring to FIG. 11, the host device 300 counts the number of free segments $N_{FS}$ (S110). A free segment may refer to a segment in which data is not written among all the segments Seg1 to Segn in the storage area shown in FIG. 7. When $N_{FS}$ is insufficient, a host GC is required to be performed.

In step S120, the counted $N_{FS}$ is compared with a first host GC threshold value. The "first host GC threshold value" may refer to a reference number of free segments for determining whether to perform a host GC operation. When $N_{FS}$ is greater than or equal to the first host GC threshold value, the number of free segments may still be sufficient, so the operation may return to step S110. In this case, after a set time has passed, step S110 may be performed again to count the number of free segments $N_{FS}$.

When $N_{FS}$ is less than the first host GC threshold value, indicating that the number of free segments is insufficient, the host GC may be performed. The host GC is performed by steps S130 to S150 described below.

First, a victim segment is selected for the host GC (S130). In step S130, a segment including a relatively large number of invalid data blocks may be selected as the victim segment. In step S130, at least one victim segment may be selected. A more detailed embodiment of step S130 is described below with reference to FIG. 12.

In step S140, each valid data block of the selected victim segment is copied to a target segment. The target segment may be selected from among free segments in which data is not stored.

After copy of the valid data block(s) is completed, the victim segment is released as a free segment (S150). Therefore, at least one victim segment is released as the free segment, thereby increasing the number of free segments.

Figure 12:
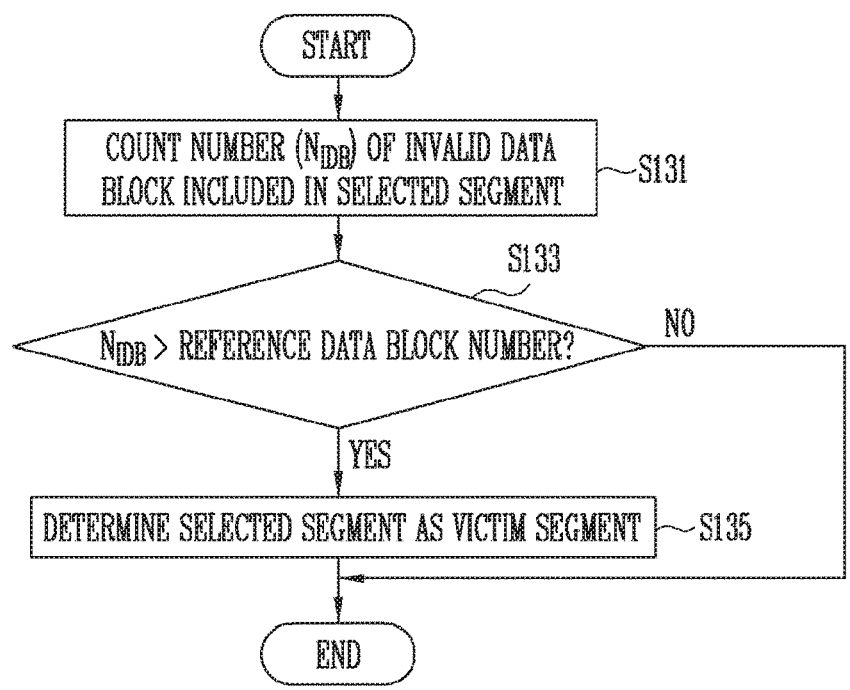
FIG. 12 is a flowchart illustrating an embodiment of selecting a victim segment of FIG. 11 according to an embodiment of the present disclosure.

FIG. 12 is a flowchart illustrating an embodiment of selecting the victim segment of FIG. 11 (S130). Steps shown in FIG. 12 illustrate a method of determining an individual segment including valid data blocks as a victim segment. That is, the method shown in FIG. 12 may be performed by sequentially selecting segments including the valid data blocks.

Referring to FIG. 12, first, the number of invalid data blocks $N_{IDB}$ included in a selected segment is counted (S131). As described above, an invalid data block is generated when a valid data block in a segment is updated. In step S131, the number of invalid data blocks $N_{IDB}$ generated is counted as described above.

In step S133, $N_{IDB}$ is compared with a reference data block number. When $N_{IDB}$ is greater than the "reference data block number", the selected segment is determined as the victim segment (S135). When $N_{IDB}$ is less than or equal to the "reference data block number", the selected segment is not determined as the victim segment.

After all steps shown in FIG. 12 are performed, another segment including at least one valid data block may be selected to perform steps of FIG. 12 again.

According to the embodiment of FIG. 12, all segments including a certain amount of invalid data are selected as the victim segments. Alternatively, a segment having the largest number of invalid data blocks among the segments including the valid data blocks may be determined as the victim segment.

Figure 13A:
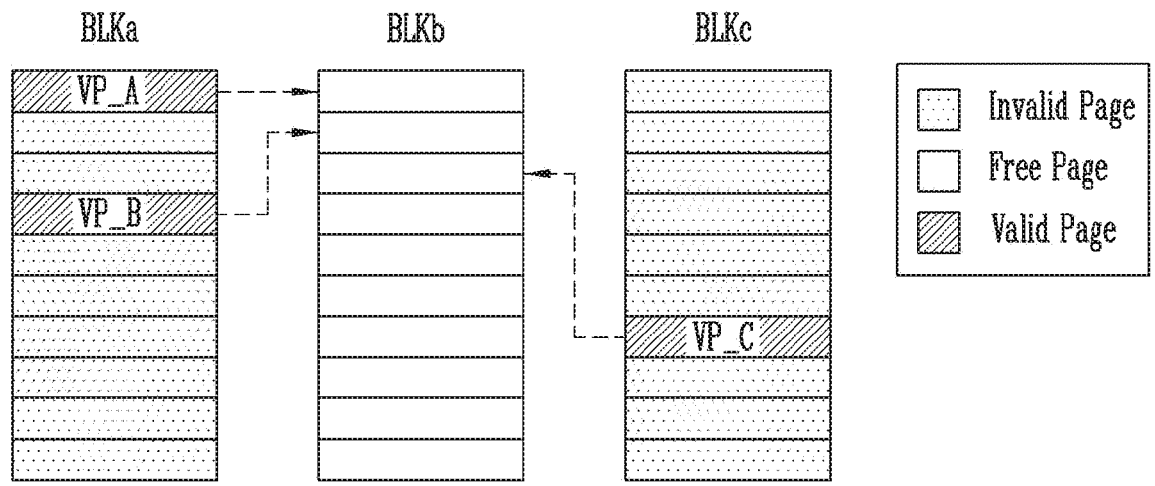
FIGS. 13A and 13B are diagrams for describing a garbage collection operation performed by a storage device.
Figure 13B:
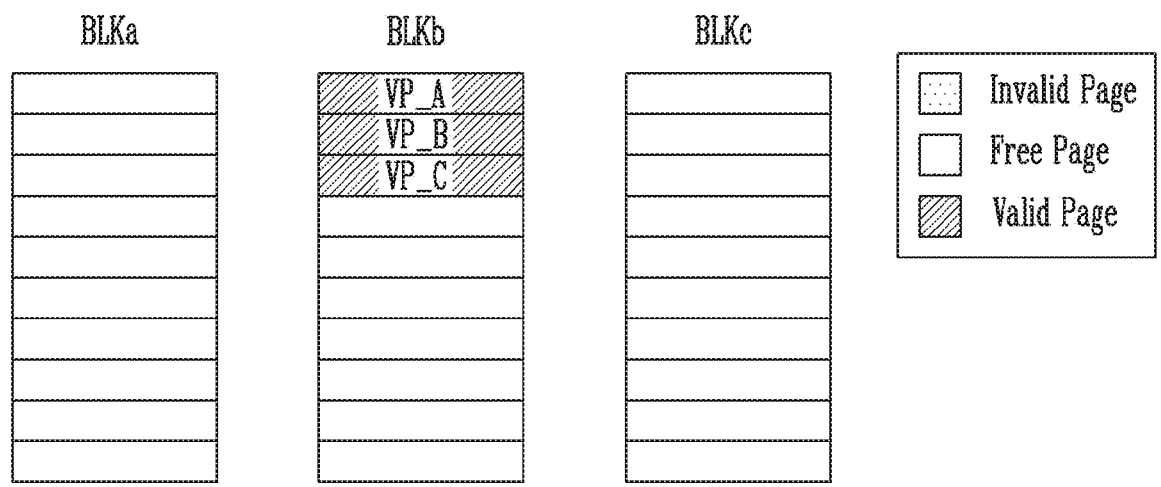

FIGS. 13A and 13B are diagrams for describing a garbage collection operation performed by the storage device 1000.

Referring to FIGS. 13A and 13B, three memory blocks BLKa, BLKb, and BLKc included in a memory cell array 110 of a semiconductor memory device 100 are illustrated. Each of the memory blocks BLKa, BLKb, and BLKc includes a plurality of pages. Each page may be one of a valid page, an invalid page, and a free page.

In FIG. 13A, the memory blocks BLKa and BLKc are victim memory blocks, and the memory block BLKb is a target memory block. The target memory block is selected from among free memory blocks in which data is not programmed.

In the garbage collection operation by the storage device 1000, that is, in the device GC, a controller 200 selects the victim memory blocks BLKa and BLKc and copies valid page data VP_A, VP_B, VP_C to the target memory block BLKb. After the device GC is performed, the memory blocks BLKa and BLKc are released as the free memory block as shown in FIG. 13B.

In the present specification, the "data block" described with reference to FIGS. 7 to 9 and the "memory block" shown in FIGS. 13A and 13B refer to different objects. The data block is a unit of data processed by a host device 300. In an example, the "data block" may refer to data of 4 KB size. Meanwhile, the memory block may refer to a data erase unit of the semiconductor memory device 100. One memory block may store a plurality of pieces of page data. In an example, the size of the page data may be 2 KB or 4 KB, and one memory block may include 32 or 64 pages. However, the present invention is not limited to these configurations.

That is, the page data according to the present invention may have various sizes, and the memory block may include various numbers of pages.

Figure 14:
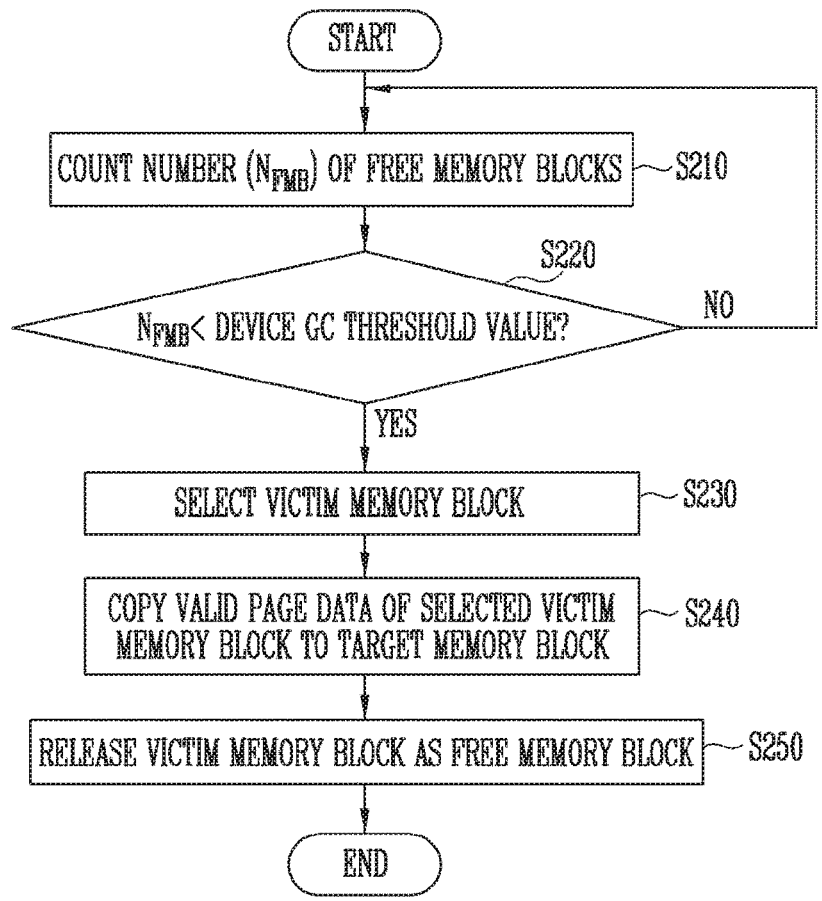
FIG. 14 is a flowchart illustrating the garbage collection operation performed by a storage device.

FIG. 14 is a flowchart illustrating a garbage collection operation performed by the storage device 1000.

Referring to FIG. 14, a controller 200 of the storage device 1000 counts the number of free memory blocks $N_{FMB}$ (S210). A free memory block may refer to a memory block in which data is not written among memory blocks BLK1 to BLKz in a memory cell array. When $N_{FMB}$ is insufficient, a device GC is required to be performed.

In step S220, the counted number of free memory blocks $N_{FMB}$ is compared with a device GC threshold value. The "device GC threshold value" may refer to a reference number of free memory blocks for determining whether to perform a device GC operation. When $N_{FMB}$ is greater than or equal to the device GC threshold value, the number of free memory blocks may still be sufficient, so the operation may return to step S210. In this case, after a set time has passed, step S210 may be performed again to count the number of free memory blocks $N_{FMB}$.

When $N_{FMB}$ is less than the device GC threshold value, indicating that the number of free memory blocks is insufficient, the device GC may be performed. The device GC is performed by steps S230 to S250 described below.

First, a victim memory block is selected for the device GC (S230). In step S230, a memory block including a relatively large number of invalid pages may be selected as the victim memory block. In step S230, at least one victim memory block may be selected. A more detailed embodiment of step S230 is described below with reference to FIG. 15.

In step S240, valid page data of the selected victim memory block is copied to a target memory block. The target memory block may be selected from among free memory blocks in which data is not stored.

After copy of the valid page data is completed, the victim memory block is released as a free memory block (S250). Therefore, at least one victim memory block is released as the free memory block, thereby increasing the number of free memory blocks.

Figure 15:
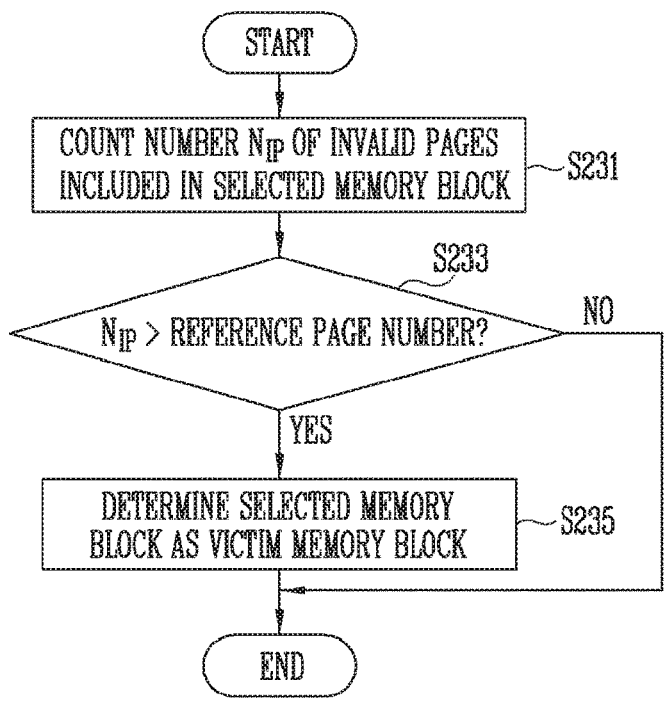
FIG. 15 is a flowchart illustrating an embodiment of selecting a victim memory block, such as S230 of FIG. 14.

FIG. 15 is a flowchart illustrating an embodiment of selecting the victim memory block of FIG. 14 (S230). Steps shown in FIG. 15 illustrate a method of determining an individual memory block including valid pages as a victim segment. That is, the method shown in FIG. 15 may be performed by sequentially selecting memory blocks including valid pages.

Referring to FIG. 15, first, the number of invalid pages $N_{IP}$ included in a selected memory block is counted (S231).

In step S233, the counted number of invalid pages $N_{IP}$ is compared with a reference page number. When $N_{IP}$ is greater than the "reference page number", the selected memory block is determined as the victim memory block (S235). When $N_{IP}$ is less than or equal to the "reference page number", the selected memory block is not determined as the victim memory block.

After all steps shown in FIG. 15 are performed, another memory block including a valid page may be selected to perform steps of FIG. 15 again.

According to the embodiment of FIG. 15, all memory blocks including a certain amount of invalid pages are selected as the victim memory blocks. Alternatively, a memory block having the largest number of invalid pages among the memory blocks including valid pages may be determined as the victim memory block.

Referring to FIGS. 10 to 15, the host GC and the device GC may be performed in a similar method. However, in general, since the host GC and the device GC are performed independently of each other, inefficiency may occur.

In accordance with an embodiment of the present disclosure, in a situation in which the device GC is expected to be performed, a victim memory block is selected, and victim LBA information included in the corresponding victim memory block is transferred to the host device 300. Meanwhile, according to an embodiment of the present disclosure, the host device 300 may perform the host GC based on the received victim LBA information. Therefore, unnecessary repetition of the host GC and the device GC may be prevented. Accordingly, an efficient garbage collection operation may be performed on the storage device 1000, and life of the storage device 1000 may be prevented from being shortened.

Figure 16:
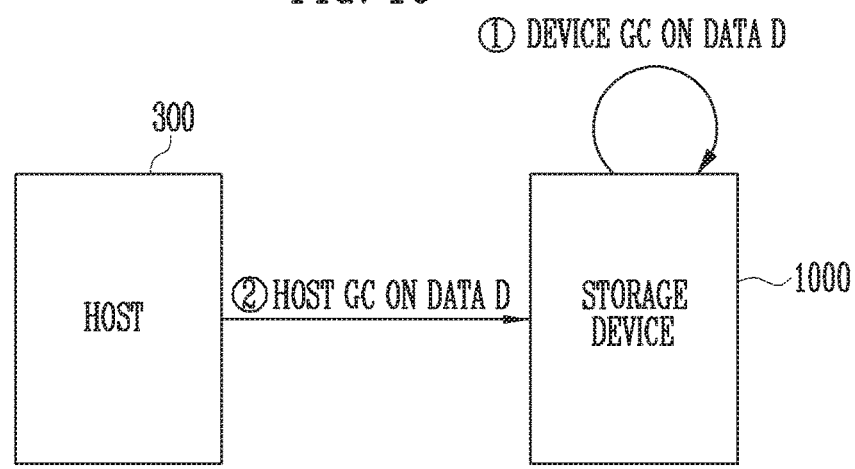
FIG. 16 is a diagram illustrating a garbage collection operation that is repeatedly performed by a storage device and a host device.

FIG. 16 is a diagram illustrating a garbage collection operation that is repeatedly performed by the storage device 1000 and the host device 300.

First, the storage device 1000 may perform a device GC for moving data D. That is, when the device GC is performed in a state in which the data D is stored in a victim memory block, the data D moves from the victim memory block to a target memory block.

Thereafter, the host device 300 may perform a host GC for changing a segment position of the data D. In this case, the data D programmed by the device GC is programmed again to another position. As a result, two program operations may be unnecessarily repeated on the data D. This may be a factor that shortens life of the storage device 1000.

FIGS. 17A, 17B, 17C, and 17D are diagrams for describing data movement due to a garbage collection operation that is repeatedly performed by the host device 300.

Figure 17A:
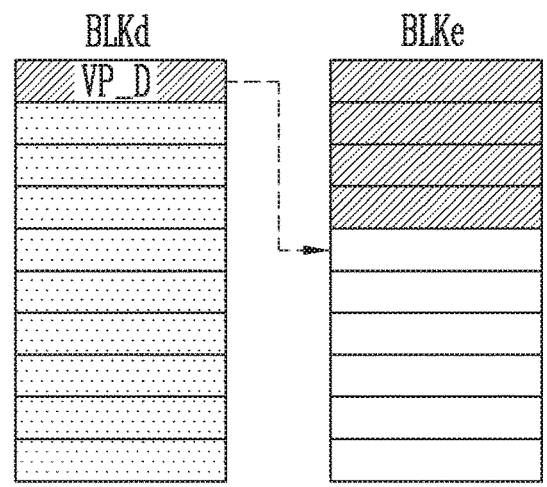
FIGS. 17A, 17B, 17C, and 17D are diagrams for describing data movement due to a garbage collection operation that is repeatedly performed.
Figure 17B:
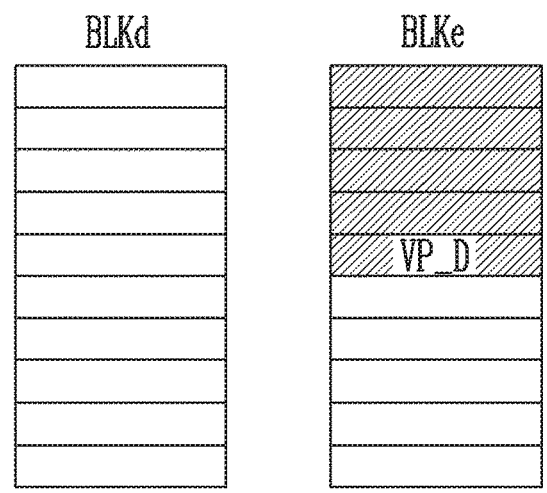

Referring to FIG. 17A, data D is shown as valid page data VP_D. That is, the valid page data VP_D corresponding to the data D is stored in a memory block BLKd. In such a situation, when a device GC operation is performed, the valid page data VP_D of a victim memory block BLKd is copied to a target memory block BLKe. When the device GC operation is completed, the valid page data VP_D is stored in a memory block BLKe as shown in FIG. 17B.

Figure 17C:
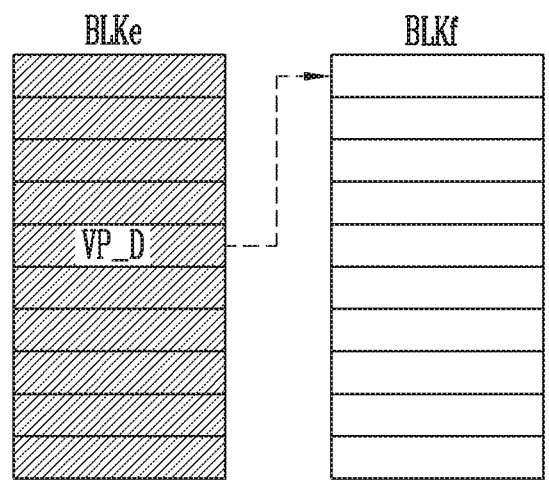
Figure 17D:
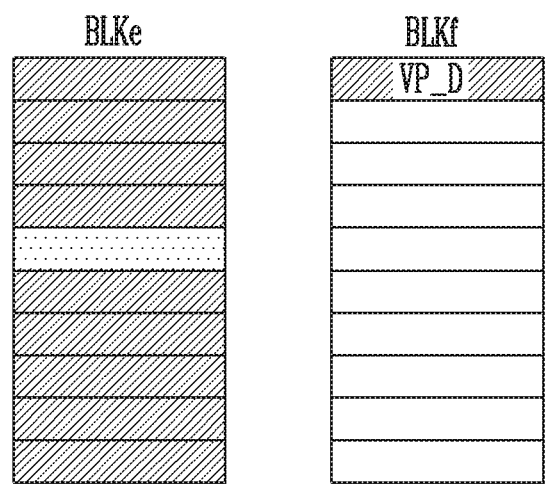

Thereafter, a host GC operation may be performed. The host GC operation may be an operation of copying a valid data block included in a victim segment to a target segment, as shown in FIG. 10. When a data block corresponding to the valid page data VP_D is a valid data block included in the victim segment A of FIG. 10, the host device 300 first may transfer a read request for reading the valid page data VP_D to the storage device 1000 to perform the host GC operation. Thereafter, the host device 300 may transfer a write request for storing the read valid page data VP_D to a position corresponding to another logical block address (LBA) to the storage device 1000. Therefore, the valid page data VP_D may be programmed in another memory block BLKf as shown in FIG. 17C. As a result, as shown in FIG. 17D, a page of the memory block BLKe in which the valid page data VP_D is stored is invalidated, and the valid page data VP_D is stored in the memory block BLKf.

Referring to FIGS. 17A to 17D, as the device GC operation and the host GC operation are successively performed on the valid page data VP_D corresponding to the data D, a program operation on the valid page data VP_D is repeatedly performed.

In accordance with an embodiment of the present disclosure, in a situation in which the device GC is expected to be performed, victim LBA information Inf_VLBA included in a victim memory block is transferred to the host device 300. Meanwhile, according to an embodiment of the present disclosure, the host device 300 may perform the host GC based on the received victim LBA information. Therefore, unnecessary repetition of the host GC and the device GC may be prevented. Accordingly, an efficient garbage collection operation may be performed on the storage device 1000, and life of the storage device 1000 may be prevented from being shortened.

Figure 18:
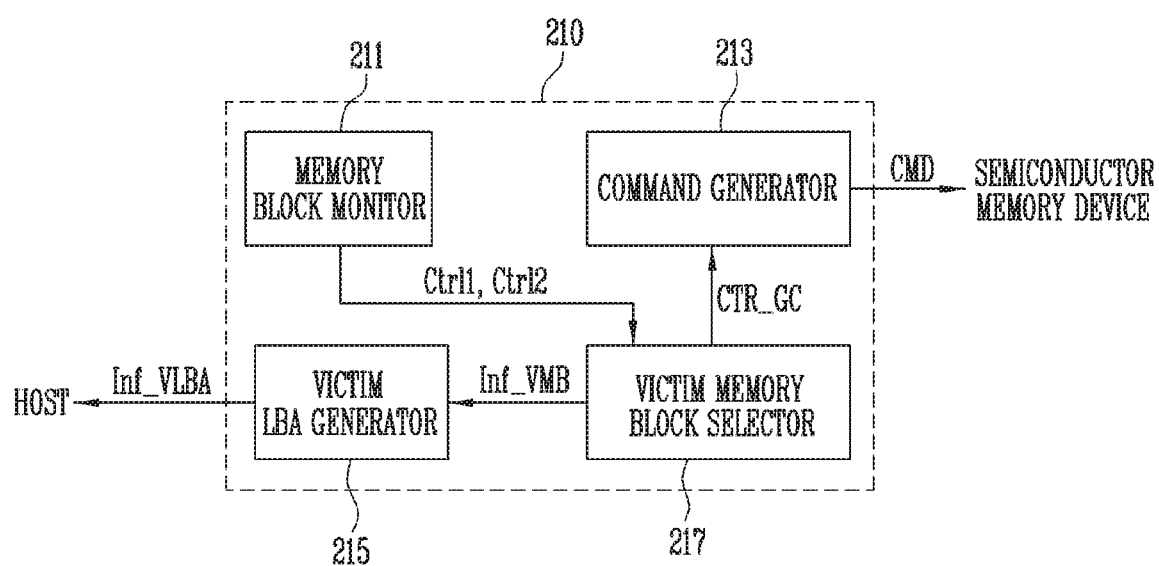
FIG. 18 is a block diagram illustrating an embodiment of a device garbage collection controller, such as that shown in FIG. 1.

FIG. 18 is a block diagram illustrating an example embodiment of the device garbage collection controller 210 shown in FIG. 1.

Referring to FIG. 18, the device garbage collection controller 210 includes a memory block monitor 211, a command generator 213, a victim memory block selector 217, and a victim LBA generator 215. The device garbage collection controller 210 may transfer commands CMD for a garbage collection operation to the semiconductor memory device 100. In addition, the device garbage collection controller 210 may transfer victim LBA information Inf_VLBA to a host device.

Figure 19:
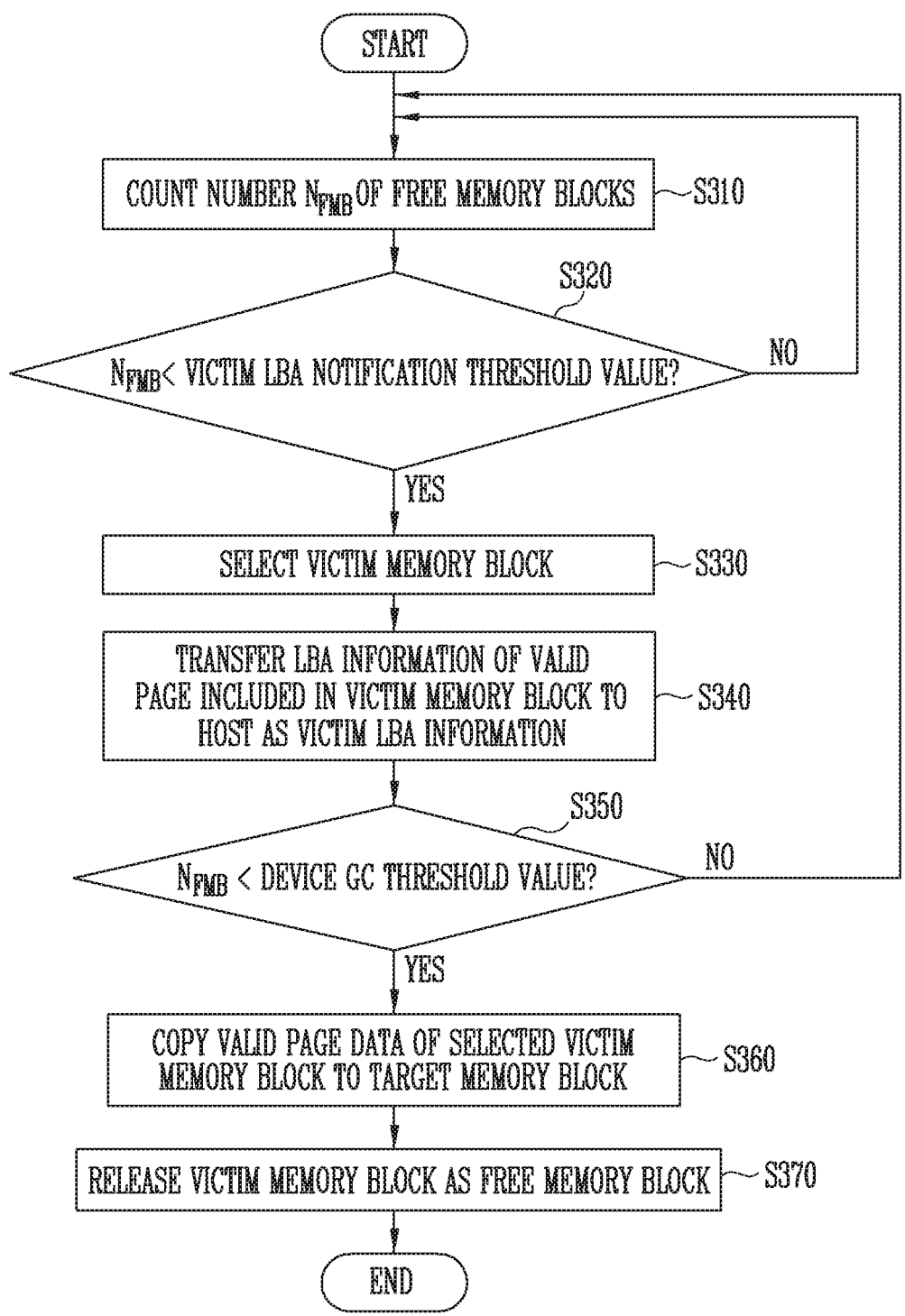
FIG. 19 is a flowchart illustrating a method of operating a storage device 1000 according to an embodiment.

FIG. 19 is a flowchart illustrating a method of operating a storage device 1000 according to an embodiment. Such method is described with reference to FIGS. 18 and 19.

In step S310, the memory block monitor 211 counts the number $N_{FMB}$ of free memory blocks. To this end, the memory block monitor 211 may store information on the current state of each of memory blocks BLK1 to BLKz included in a semiconductor memory device 100. That is, the memory block monitor 211 may store information indicating whether each of the memory blocks BLK1 to BLKz is a free memory block or a memory block in which data is stored.

In step S320, the memory block monitor 211 determines whether the current number of free memory blocks NFMB is less than a victim LBA notification threshold value. The "victim LBA notification threshold value" may be a reference value for determining whether to transfer LBA information of valid page(s) included in a victim memory block that is likely to be selected as a target of the device GC later to the host device. When NFMB is greater than or equal to the victim LBA notification threshold value (S320: NO), that indicates that a device GC operation is not expected to be performed within a short time, so the method returns to step S310 without notifying the host, that is, without providing victim LBA information to the host. Thereafter, after a set time has passed, step S310 may be performed again.

When $N_{FMB}$ is less than the victim LBA notification threshold value (S320: YES), this means that the device GC operation is expected to be performed soon. Therefore, the memory block monitor 211 transfers a first control signal Ctrl1 to the victim memory block selector 217. The first control signal Ctrl1 may be for instructing to select the victim memory block and to transfer the LBA information of the valid pages included in the selected victim memory block to the host device 300.

In step S330, the victim memory block selector 217 selects the victim memory block in response to the first control signal Ctrl1. In an embodiment, selecting the victim memory block (S330) may be performed by the method shown in FIG. 15. The victim memory block selector 217 transfers information indicating the selected victim memory block Inf_VMB to the victim LBA generator 215. The Inf_VMB may identify which memory block among the memory blocks BLK1 to BLKz in the semiconductor memory device 100 is selected as the victim memory block.

The victim LBA generator 215 generates victim LBA information based on the Inf_VMB. The victim LBA information Inf_VLBA may indicate an LBA of a valid page among pages included in the victim memory block. The victim LBA generator 215 transfers the generated victim LBA information Inf_VLBA to the host device 300 (S340). In step S340, the victim LBA information Inf_VLBA may be included in a response message for a request or the like received from the host device 300 and transmitted to the host device 300.

Thereafter, the memory block monitor 211 determines whether the number of free memory blocks $N_{FMB}$ is less than a device GC threshold value (S350). The "device GC threshold value" may represent a reference number of free memory blocks for determining whether to perform a device GC operation. The victim LBA notification threshold value of step S320 may be greater than the device GC threshold value of step S350.

When $N_{FMB}$ is less than the device GC threshold value (S350: YES), indicating that the number of free memory blocks is insufficient, the device GC may be performed. In this case, the memory block monitor 211 transfers a second control signal Ctrl2 to the victim memory block selector 217. The second control signal Ctrl2 may be for performing a garbage collection operation on the selected victim memory block.

In response to the second control signal Ctrl2, the victim memory block selector 217 transfers a GC control signal CTRL_GC to the command generator 213. In response to the GC control signal CTRL_GC, the command generator 213 transfers commands for copying valid page data of the selected victim memory block to a target memory block, to the semiconductor memory device 100 (S360). Thereafter, in step S370, the memory block monitor 211 releases the victim memory block as a free memory block.

Referring to FIGS. 18 and 19, when the device GC is expected (S320: YES), the storage device 1000 according to an embodiment of the present disclosure selects the victim memory block and transfers the LBA information of the valid page included therein to the host device 300. The host device 300 may perform a host GC based on the received victim LBA information. When the host GC is performed on the data D exemplified with reference to FIGS. 16 to 17D, the data D is moved from the victim memory block to another memory block.

Therefore, when the device GC is subsequently performed, since the data D is not included in the victim memory block, repetitive data storage does not occur. That is, the repetitive program operation of the valid page data as described with reference to FIGS. 17A to 17D does not occur. Accordingly, an efficient garbage collection operation may be performed on the storage device 1000, and life of the storage device 1000 may be prevented from being shortened.

An operation of the host device 300 receiving the victim LBA information is described below with reference to FIGS. 20 to 22.

Figure 20:
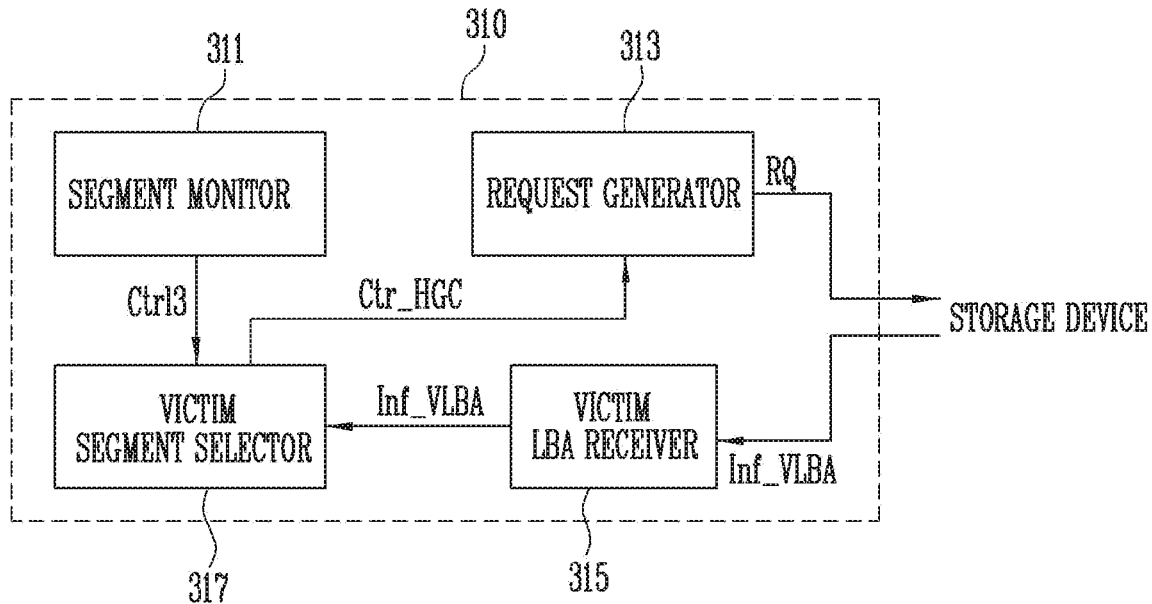
FIG. 20 is a block diagram illustrating an embodiment of a host garbage collection controller, such as that shown in FIG. 1.

FIG. 20 is a block diagram illustrating an embodiment of the host garbage collection controller 310 shown in FIG. 1.

Referring to FIG. 20, the host garbage collection controller 310 includes a segment monitor 311, a request generator 313, a victim LBA receiver 315, and a victim segment selector 317. The host garbage collection controller 310 may receive victim LBA information Inf_VLBA from a storage device 1000. In addition, the host garbage collection controller 310 may transfer a request RQ to the storage device 1000. The storage device 1000 may perform operations based on the received request RQ.

Figure 21:
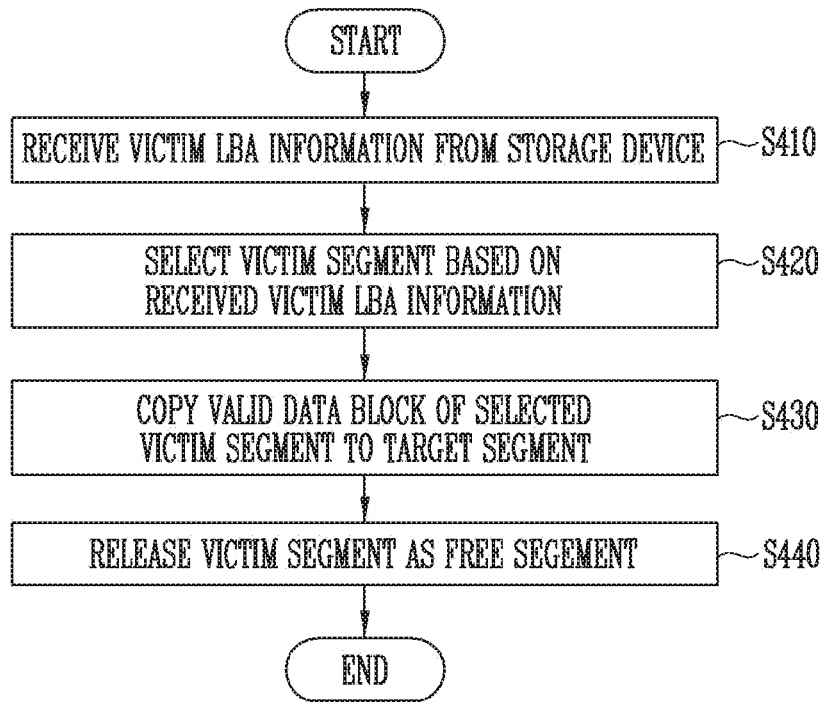
FIG. 21 is a flowchart illustrating a method of operating a host device according to an embodiment.

FIG. 21 is a flowchart illustrating a method of operating a host device 300 according to an embodiment. Such method is described with reference to FIGS. 20 and 21.

In step S410, the victim LBA receiver 315 receives the victim LBA information Inf_LBA from the storage device. The victim LBA information Inf_LBA may be information on a logical block address (LBA) of a valid page included in a victim memory block selected by the storage device 1000. The victim LBA receiver 315 transfers the received victim LBA information Inf_LBA to the victim segment selector 317.

In step S420, the victim segment selector 317 selects a victim segment based on the received victim LBA information. More specifically, a segment including the LBA corresponding to the received victim LBA information may be selected as the victim segment.

In step S430, a valid data block of the selected victim segment may be copied to a target segment. To this end, the victim segment selector 317 transfers a control signal Ctr_HGC for performing a host GC based on the selected victim segment to the request generator 313. The request generator 313 generates requests RQ for performing the host GC and transmits the generated requests RQ to the storage device 1000. The requests RQ for performing the host GC may be for storing a valid data block included in the selected victim segment in an LBA corresponding to another segment.

In step S440, the victim segment is released as a free segment.

According to the embodiment shown in FIG. 21, whenever the host device 300 receives the victim LBA information Inf_VLBA, the host GC operation is performed. In this case, as the host GC operation is performed frequently, performance of the host device 300 and the storage device 1000 may be degraded.

According to another embodiment of the present disclosure, when the host device 300 receives the victim LBA information Inf_LBA, the host GC operation may be performed when the number of free segments is less than or equal to a reference, which may be predetermined. According to the above-described embodiment, even though the host device 300 receives the victim LBA information Inf_VLBA, the host GC operation is performed only when the number of free segments is insufficient. Therefore, performance degradation of the host device 300 and the storage device 1000 may be prevented.

Figure 22:
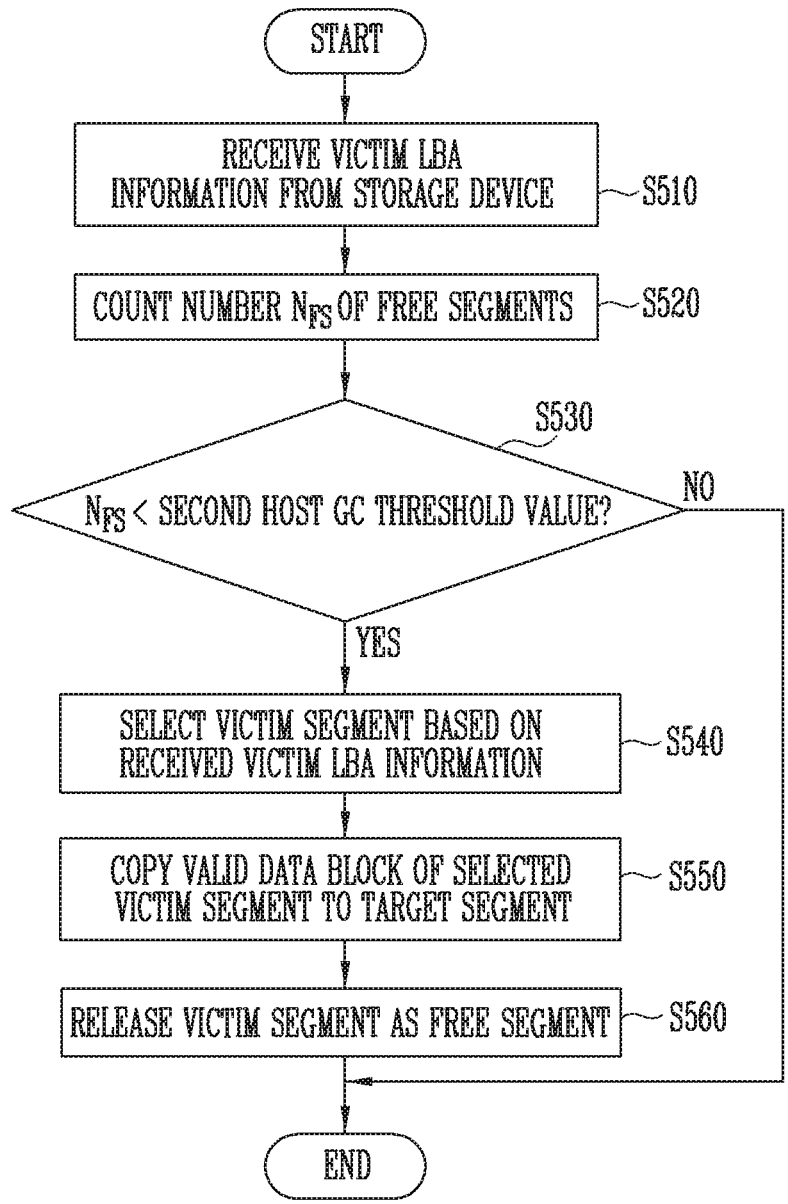
FIG. 22 is a flowchart illustrating a method of operating a host device according to another embodiment.

FIG. 22 is a flowchart illustrating a method of operating the host device 300 according to another embodiment. Such method is described with reference to FIGS. 20 and 22.

In step S510, the victim LBA receiver 315 receives the victim LBA information Inf_LBA from the storage device. The victim LBA information Inf_LBA may be information on a logical block address (LBA) of a valid page included in the victim memory block selected by the storage device 1000. The victim LBA receiver 315 transfers the received victim LBA information Inf_LBA to the victim segment selector 317.

In step S520, the segment monitor 311 counts the number of free segments $N_{FS}$. Thereafter, the segment monitor 311 determines whether $N_{FS}$ is less than a second host GC threshold value (S530). When $N_{FS}$ is greater than or equal to the second host GC threshold value (S530: NO), a host GC operation is not performed. When $N_{FS}$ is less than the second host GC threshold value (S530: YES), the host GC operation is performed through steps S540 to S560. In this case, the segment monitor 311 transfers a third control signal Ctrl3 to the victim segment selector 317. The third control signal Ctrl3 may be for selecting the victim segment to perform the host GC.

In step S540, the victim segment selector 317 receiving the third control signal Ctrl3 selects the victim segment based on the received victim LBA information. More specifically, a segment including the LBA corresponding to the received victim LBA information may be selected as the victim segment.

In step S550, a valid data block of the selected victim segment may be copied to a target segment. To this end, the victim segment selector 317 transfers a control signal Ctr_HGC for performing the host GC based on the selected victim segment to the request generator 313. The request generator 313 generates requests RQ for performing the host GC and transfers the generated requests RQ to the storage device 1000. The requests RQ for performing the host GC may be requests for storing a valid data block included in the selected victim segment in an LBA corresponding to another segment.

Thereafter, in step S560, the victim segment is released as a free segment.

Figure 23:
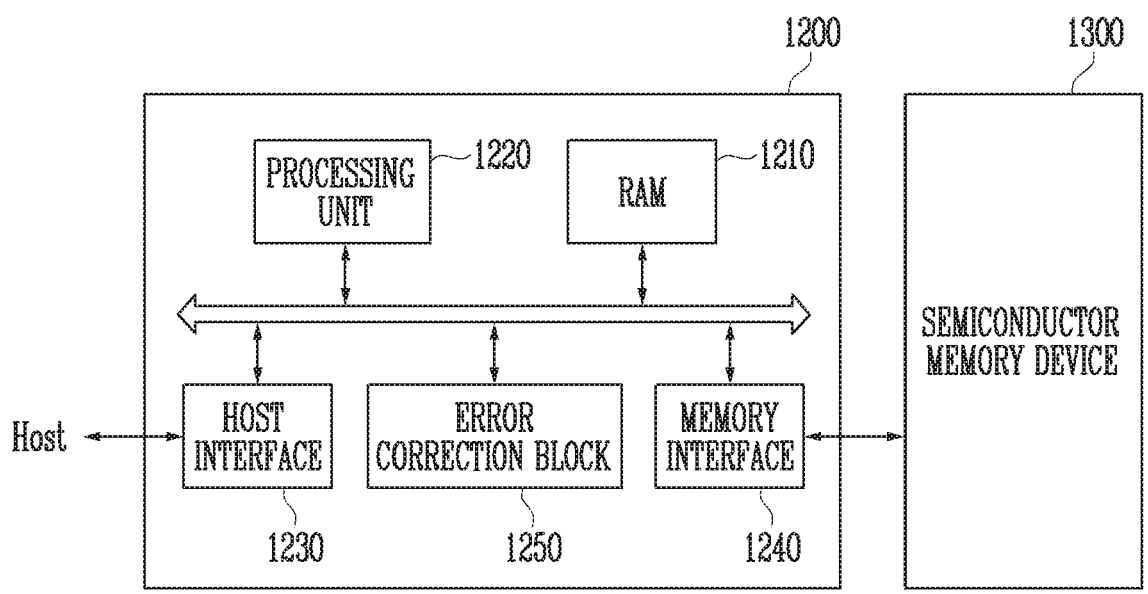
FIG. 23 is a block diagram illustrating a storage device including a semiconductor memory device and a controller.

FIG. 23 is a block diagram illustrating a storage device 1000 including a semiconductor memory device and a controller.

The semiconductor memory device 1300 of FIG. 23 may be configured and operate in the same manner as the semiconductor memory device 100 described with reference to FIG. 2. Thus, previously described details are not repeated here.

The controller 1200 is connected to the host device and the semiconductor memory device 1300. The controller 1200 is configured to access the semiconductor memory device 1300 in response to the request from the host device. For example, the controller 1200 is configured to control read, program, erase, and background operations of the semiconductor memory device 1300. The controller 1200 is configured to provide an interface between the semiconductor memory device 1300 and the host device. The controller 1200 is configured to drive firmware for controlling the semiconductor memory device 1300.

The controller 1200 includes a random access memory (RAM) 1210, a processing unit, i.e., processor, 1220, a host interface 1230, a memory interface 1240, and an error correction block 1250.

The RAM 1210 is used as any of an operation memory of the processing unit 1220, a cache memory between the semiconductor memory device 1300 and the host device (Host), and a buffer memory between the semiconductor memory device 100 and the host.

The processing unit 1220 controls overall operations of the controller 1200. The processing unit 1220 is configured to control a read operation, a program operation, an erase operation, and a background operation of the semiconductor memory device 1300. The processing unit 1220 is configured to drive firmware for controlling the semiconductor memory device 1300. The processing unit 1220 may perform a function of a flash translation layer (FTL). The processing unit 1220 may convert a logical block address (LBA) provided by the host device into a physical block address (PBA) through the flash translation layer (FTL). The flash translation layer (FTL) may receive a logical block address (LBA) by using a mapping table and convert the logical block address (LBA) into a physical block address (PBA). There are several address mapping methods of the flash translation layer according to a mapping unit. A representative address mapping method includes a page mapping method, a block mapping method, and a hybrid mapping method.

The host interface 1230 includes a protocol for performing data exchange between the host device and the controller 1200. In an embodiment, the controller 1200 is configured to communicate with the host device through at least one of various interface protocols, such as a universal serial bus (USB) protocol, a multimedia card (MMC) protocol, a peripheral component interconnection (PCI) protocol, a PCI-express (PCI-E) protocol, an advanced technology attachment (ATA) protocol, a serial ATA protocol, a parallel ATA protocol, a small computer small interface (SCSI) protocol, an enhanced small disk interface (ESDI) protocol, an integrated drive electronics (IDE) protocol, and a private protocol.

The memory interface 1240 interfaces with the semiconductor memory device 1300. For example, the memory interface 120 includes a NAND interface or a NOR interface.

The error correction block 1250 is configured to detect and correct an error of data received from the semiconductor memory device 1300 using an error correcting code (ECC). The error correction block 1250 may correct an error by using an error correction code on read page data. The error correction block 1250 may correct an error by using a low density parity check (LDPC) code, a Bose, Chaudhri, Hocquenghem (BCH) code, a turbo code, a reed-Solomon code, a convolution code, a recursive systematic code (RSC), coded modulation such as trellis-coded modulation (TCM), block coded modulation (BCM), and a hamming code.

During a read operation, the error correction block 1250 may correct an error of the read page data. Decoding may fail when the read page data includes error bits that exceed a correctable number of bits. The decoding may be successful when the page data includes error bits equal to or less than the correctable number of bits. The success of the decoding indicates that a read command has passed. The failure of the decoding indicates that the read command has failed. When the decoding is successful, the controller 1200 outputs page data in which the error is corrected to the host device.

The controller 1200 and the semiconductor memory device 1300 may be integrated into one semiconductor device. In an embodiment, the controller 1200 and the semiconductor memory device 1300 may be integrated into one semiconductor device to form a memory card, such as a PC card (personal computer memory card international association (PCMCIA)), a compact flash card (CF), a smart media card (SM or SMC), a memory stick, a multimedia card (MMC, RS-MMC, or MMCmicro), an SD card (SD, miniSD, microSD, or SDHC), and/or a universal flash storage (UFS).

The controller 1200 and the semiconductor memory device 1300 may be integrated into one semiconductor device to form a semiconductor drive (solid state drive (SSD)). The semiconductor drive (SSD) includes a storage device configured to store data in a semiconductor memory. When the storage device is used as the semiconductor drive (SSD), an operation speed of the host device connected to the storage device is dramatically improved.

In another example, the storage device 1000 is provided as one of various components of an electronic device such as a computer, an ultra-mobile PC (UMPC), a workstation, a net-book, a personal digital assistants (PDA), a portable computer, a web tablet, a wireless phone, a mobile phone, a smart phone, an e-book, a portable multimedia player (PMP), a portable game machine, a navigation device, a black box, a digital camera, a 3-dimensional television, a digital audio recorder, a digital audio player, a digital picture recorder, a digital picture player, a digital video recorder, and a digital video player, a device capable of transmitting and receiving information in a wireless environment, one of various electronic devices configuring a home network, one of various electronic devices configuring a computer network, one of various electronic devices configuring a telematics network, an RFID device, or one of various components configuring a computing system.

In an embodiment, the semiconductor memory device 1300 or the storage device may be mounted as a package of various types. For example, the semiconductor memory device 1300 or the storage device may be packaged and mounted in a method such as a package on package (PoP), ball grid arrays (BGAs), chip scale packages (CSPs), plastic leaded chip carriers (PLCC), a plastic dual in line package (PDIP), a die in waffle pack, die in wafer form, a chip on board (COB), a ceramic dual in line package (CERDIP), a plastic metric quad flat pack (MQFP), a thin quad flat pack (TQFP), a small outline integrated circuit (SOIC), a shrink small outline package (SSOP), a thin small outline package (TSOP), a thin quad flat pack (TQFP), a system in package (SIP), a multi-chip package (MCP), a wafer-level fabricated package (WFP), or a wafer-level processed stack package (WSP).

Figure 24:
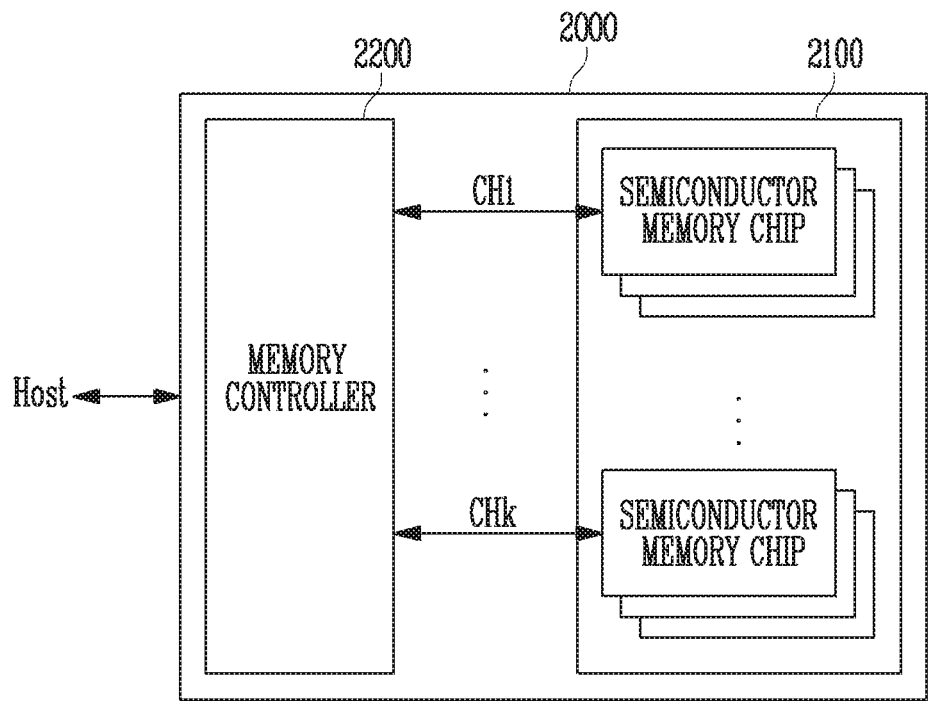
FIG. 24 is a block diagram illustrating an application example of a storage device, such as that of FIG. 23.

FIG. 24 is a block diagram illustrating an application example of the storage device of FIG. 23.

Referring to FIG. 24, the storage device 2000 includes a semiconductor memory device 2100 and a controller 2200. The semiconductor memory device 2100 includes a plurality of semiconductor memory chips. The plurality of semiconductor memory chips are divided into a plurality of groups.

In FIG. 24, the plurality of, e.g., k, groups communicate with the controller 2200 through first to k-th channels CH1 to CHk, respectively. Each semiconductor memory chip is configured and is operated similarly to one of the semiconductor memory device 1300 described with reference to FIG. 23.

Each group is configured to communicate with the controller 2200 through one common channel. The controller 2200 is configured similarly to the controller 1200 described with reference to FIG. 10 and is configured to control the plurality of memory chips of the semiconductor memory device 2100 through the plurality of channels CH1 to CHk.

In FIG. 24, the plurality of semiconductor memory chips in a given group are connected to one channel. However, it will be understood that the storage device 2000 may be modified such that one semiconductor memory chip is connected to one channel.

Figure 25:
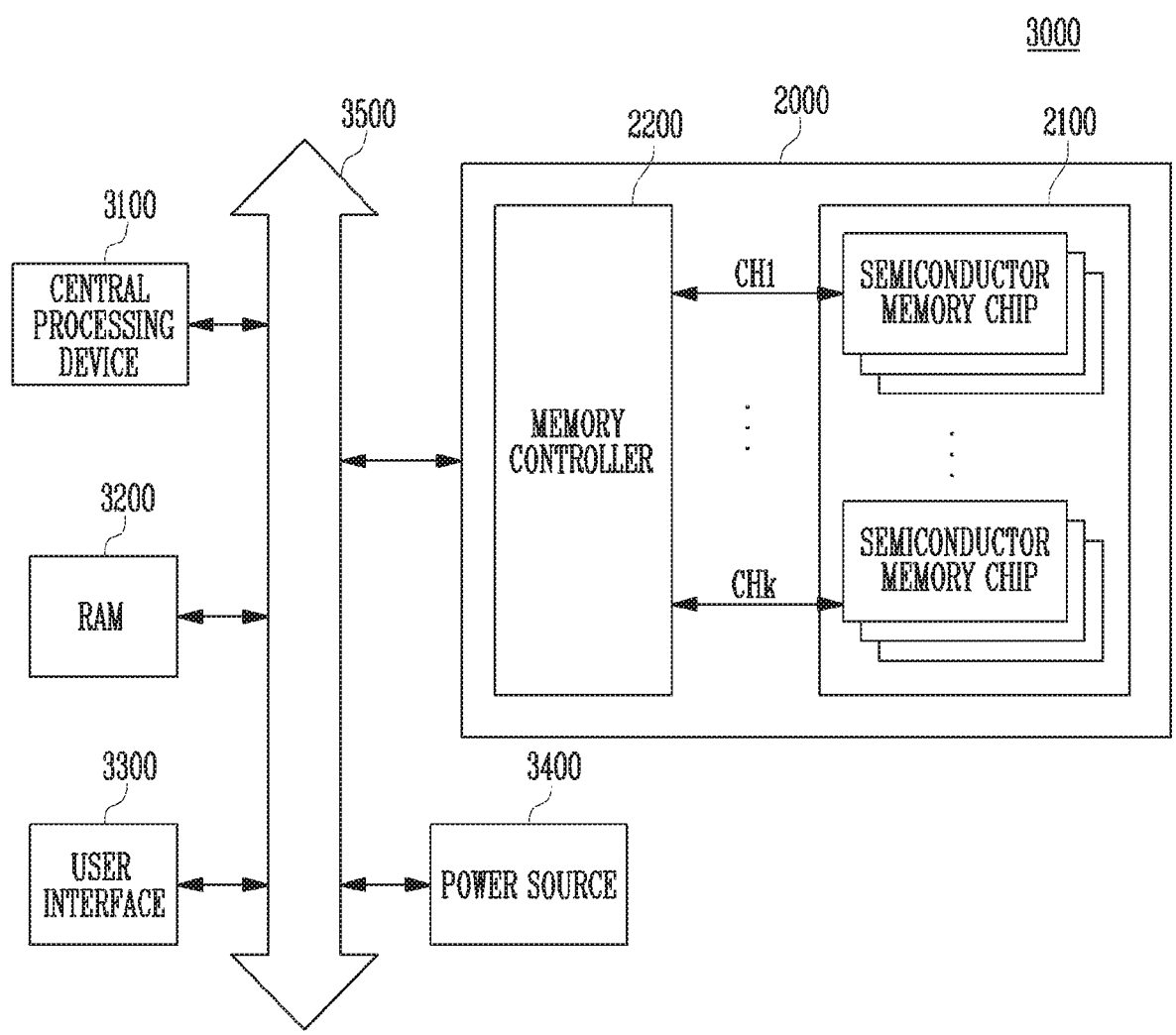
FIG. 25 is a block diagram illustrating a computing system including a storage device, such as that described with reference to FIG. 24.

FIG. 25 is a block diagram illustrating a computing system including the storage device described with reference to FIG. 24.

Referring to FIG. 25, the computing system 3000 includes a central processing device 3100, a random access memory (RAM) 3200, a user interface 3300, a power source 3400, a system bus 3500, and the storage device 2000.

The storage device 2000 is electrically connected to the central processing device 3100, the RAM 3200, the user interface 3300, and the power source 3400 through the system bus 3500. Data provided through the user interface 3300 or processed by the central processing device 3100 is stored in the storage device 2000.

In FIG. 25, the semiconductor memory chip 2100 is connected to the system bus 3500 through the controller 2200. However, the semiconductor memory chip 2100 may be configured to be directly connected to the system bus 3500. A function of the controller 2200 is performed by the central processing device 3100 and the RAM 3200.

In FIG. 25, the storage device 2000 described with reference to FIG. 24 is provided. However, the storage device 2000 may be replaced with the storage device 1000 described with reference to FIG. 23. In an embodiment, the computing system 3000 may be configured to include both of the storage devices 1000 and 2000 described with reference to FIGS. 23 and 24.

Although the present invention has been illustrated and described in the context of various embodiments, the present invention is not limited to the embodiments described above. Rather, the present invention encompasses various changes and modifications may be made from the disclosed description by those skilled in the art to which the present disclosure pertains.

Therefore, the scope of the present invention is defined by the claims and their equivalents.

In the embodiments described above, in some situations, steps may optionally be performed, omitted, or combined. In addition, the steps need not necessarily be performed in in the disclosed order. Generally, the disclosed embodiments are merely specific examples to facilitate understanding of the present invention, rather than to limit its scope. That is, it will be apparent to those skilled in the art to which the present invention pertains that various modifications based on the technical spirit of the present disclosure are possible.

Although specific terms are used in the foregoing description, such terms are not intended to limit the scope of the present invention. The present invention encompasses all modifications and variations that fall within the scope of the claims and their equivalents.

What is claimed is:

1. A data processing system comprising:
a storage device including:
a memory device including plural memory blocks each having plural pages; and
a controller configured to control the memory device to perform a garbage collection operation at a memory block level on select memory blocks among the memory blocks in response to a determination that a number of free memory blocks is less than a first threshold, and to output victim LBA information in response to a determination that the number of free memory blocks among the memory blocks is less than a second threshold greater than the first threshold; and
a host device that stores data in a storage area in the storage device, the storage area being divided into a plurality of segments, the host device comprising:
a host GC controller for controlling a host garbage collection operation,
wherein the host GC controller comprises:
a victim LBA receiver configured to receive the victim LBA information from the storage device;
a victim segment selector configured to select a victim segment targeted for the host garbage collection operation, based on the victim LBA information; and
a request generator configured to generate at least one request for controlling the storage device to perform the host garbage collection operation, based on the victim segment,
wherein the victim LBA information includes a logical block address of a valid page in a memory block selected, by the storage device, as a victim memory block of a device garbage collection operation.

2. The data processing system of claim 1,
wherein each of the plurality of segments includes a plurality of data blocks, and
wherein the victim segment selector selects a segment including a data block corresponding to the victim LBA information among the plurality of segments as the victim segment.

3. The data processing system of claim 1,
wherein the host GC controller further comprises a segment monitor that counts a number of free segments among the plurality of segments,
wherein the segment monitor generates a third control signal when the number of free memory blocks is less than a host GC threshold value,
wherein the victim segment selector generates an HGC control signal for performing a host garbage collection operation on the victim segment, in response to the third control signal, and
wherein the request generator generates the at least one request for controlling the storage device to perform the host garbage collection operation, in response to the HGC control signal.

4. A method of operating a host device that stores data in a storage area of a storage device, the storage area being divided into a plurality of segments, the method comprising:
receiving victim LBA information from the storage device; and
performing a host garbage collection operation based on the victim LBA information,
wherein the victim LBA information is provided from the storage device when a number of free memory blocks of the storage device is less than a predetermined threshold, and
wherein the victim LBA information includes a logical block address of a valid page in a memory block selected, by the storage device, as a victim memory block of a device garbage collection operation.

5. The method of claim 4, wherein the performing of the host garbage collection operation based on the victim LBA information comprises:
selecting a victim segment among the plurality of segments based on the victim LBA information; and
copying a valid data block of the victim segment to a target segment.

6. The method of claim 5, wherein the performing of the host garbage collection operation based on the victim LBA information further comprises releasing the victim segment as a free segment.

7. The method of claim 4, wherein the performing of the host garbage collection operation based on the victim LBA information comprises:
counting a number of free segments among the plurality of segments;
determining whether the number of free segments is less than a host GC threshold value;
selecting a victim segment from the plurality of segments based on the victim LBA information when the number of free segments is less than the host GC threshold value; and
copying a valid data block of the victim segment to a target segment.

8. A data processing system comprising:
a memory system including:
a memory device including plural memory blocks each having plural pages; and
a controller configured to control the memory device to perform a garbage collection operation at a memory block level on select memory blocks among the memory blocks, when a number of free blocks is less than a first threshold; and a host configured to control the memory system to perform a garbage collection operation at a data segment level based on information of logical addresses of one or more valid pages included in one or more victim blocks selected among the memory blocks, wherein the controller is further configured to provide the information to the host when the number of free blocks among the memory blocks is less than a second threshold, and wherein the first threshold is less than the second threshold.

* * * * *